US011048495B2

(12) United States Patent
Kim et al.

(10) Patent No.: US 11,048,495 B2
(45) Date of Patent: Jun. 29, 2021

(54) METHOD AND APPARATUS FOR MULTIMODAL OPERATION OF NEAR FIELD COMMUNICATIONS CIRCUITRY

(71) Applicant: Samsung Electronics Co., Ltd, Suwon-si (KR)

(72) Inventors: Choonghoon Kim, Suwon-si (KR); Youngil Nam, Suwon-si (KR); Junkyoung Shin, Suwon-si (KR); Sungjun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 16/283,319

(22) Filed: Feb. 22, 2019

(65) Prior Publication Data

US 2019/0258472 A1 Aug. 22, 2019

(30) Foreign Application Priority Data

Feb. 22, 2018 (KR) .................. 10-2018-0021193

(51) Int. Cl.
  *G06F 8/65* (2018.01)
  *H04B 5/00* (2006.01)
  *H04W 4/80* (2018.01)

(52) U.S. Cl.
  CPC ............. *G06F 8/65* (2013.01); *H04B 5/0031* (2013.01); *H04W 4/80* (2018.02)

(58) Field of Classification Search
  CPC ..... G06F 8/60–66; H04B 5/00; H04B 5/0031; H04B 5/0037; H04W 4/80; H04L 67/34
  See application file for complete search history.

(56) References Cited

U.S. PATENT DOCUMENTS

| 8,880,049 B2 * | 11/2014 | Furuta ...................... G06F 8/65 455/418 |
| 8,930,931 B2 * | 1/2015 | Haramiishi ............. G06F 8/654 717/168 |

(Continued)

FOREIGN PATENT DOCUMENTS

| CN | 102662699 A | * | 9/2012 | ............. G06F 8/654 |
| CN | 104618888 A | * | 5/2015 | ............. G06F 8/654 |

(Continued)

OTHER PUBLICATIONS

Machine Translation of CN102662699, Espacenet [online], 2020 [retrieved Aug. 13, 2020], Retrieved from Internet: <URL: https://worldwide.espacenet.com/publicationDetails/description?CC=CN&NR=102662699A&KC=A&FT=D&ND=3&date=20120912&DB=EPODOC&locale=en_EP>, pp. 1-7.*

(Continued)

*Primary Examiner* — Todd Aguilera

(57) ABSTRACT

Various embodiments include an electronic device and method for near field communications. An electronic device comprises a memory, a first communication circuit, a second communication circuit, and at least one processor operatively connected with the memory, the first communication circuit, or the second communication circuit, wherein the processor identifies an occurrence of a designated event for the electronic device while at least one piece of first software stored in the memory is performed, in response to the occurrence of the designated event, receives update software for the at least one piece of first software from an external device through the second communication circuit, and updates the at least one piece of first software using the received update software, and wherein the first communication circuit operates in a first mode before the at least one (Continued)

piece of first software is updated and transitions into a second mode.

20 Claims, 11 Drawing Sheets

(56) References Cited

U.S. PATENT DOCUMENTS

| | | | |
|---|---|---|---|
| 9,119,160 B2* | 8/2015 | Hall | H04W 52/028 |
| 9,681,383 B2* | 6/2017 | Mikami | H04B 5/0037 |
| 10,206,082 B2* | 2/2019 | Khan | H04W 4/80 |
| 2010/0029202 A1 | 2/2010 | Jolivet et al. | |
| 2011/0019774 A1* | 1/2011 | Furuta | G06F 8/65 |
| | | | 375/340 |
| 2011/0099544 A1* | 4/2011 | Haramiishi | G06F 8/654 |
| | | | 717/168 |
| 2013/0084800 A1 | 4/2013 | Troberg et al. | |
| 2013/0084803 A1* | 4/2013 | Hall | H04W 52/028 |
| | | | 455/41.1 |
| 2014/0089710 A1 | 3/2014 | Yeh et al. | |
| 2014/0220961 A1* | 8/2014 | Polson | H04L 67/04 |
| | | | 455/419 |
| 2015/0173020 A1* | 6/2015 | Mikami | H04B 5/0037 |
| | | | 370/311 |
| 2015/0287025 A1 | 10/2015 | Royston | |
| 2016/0360352 A1* | 12/2016 | Khan | H04W 4/80 |
| 2017/0286085 A1 | 10/2017 | Steshenko et al. | |

FOREIGN PATENT DOCUMENTS

| | | |
|---|---|---|
| EP | 2852070 A1 | 3/2015 |
| KR | 10-1756238 B1 | 7/2017 |
| WO | 2010039337 A2 | 4/2010 |

OTHER PUBLICATIONS

Machine Translation of CN104618888, Espacenet [online], 2020 [retrieved Aug. 17, 2020], Retrieved from Internet: <URL: https://worldwide.espacenet.com/publicationDetails/description?CC=CN&NR=104618888A&KC=A&FT=D&ND=3&date=20150513&DB=EPODOC&locale=en_EP>, pp. 1-6.*

International Search Report and Written Opinion regarding International Application No. PCT/KR2019/000587, dated Apr. 24, 2019, 7 pages.

Supplementary European Search Report dated Dec. 22, 2020 in connection with European Patent Application No. 19 75 7628, 13 pages.

* cited by examiner

METHOD AND APPARATUS FOR MULTIMODAL OPERATION OF NEAR FIELD COMMUNICATIONS CIRCUITRY

CROSS-REFERENCE TO RELATED APPLICATION

This application is based on and claims priority under 35 U.S.C. § 119 to Korean Patent Application No. 10-2018-0021193, filed on Feb. 22, 2018, in the Korean Intellectual Property Office, the disclosure of which is incorporated by reference herein in its entirety.

BACKGROUND

1. Field

Various embodiments of the disclosure relate to near-field communication (NFC), and more specifically, to methods and apparatuses for multimodal operation of NFC circuitry.

2. Description of Related Art

'NFC technology' typically refers to contactless communication technology adopting a frequency band of 13.56 MHz among radio-frequency identification (RFID) technologies. NFC technology presents various advantages, such as relatively high security characteristics, low price, and no need for a dongle reader and inter-device settings that would be required for Bluetooth.

NFC technology operates in various modes (or functions), e.g., reader/writer mode in which NFC data can be read or written, peer-to-peer (P2P) mode in which inter-device communications are possible for exchanging information, and card emulation mode in which NFC data can be emulated. The card emulation mode may provide payment functionality for stores, public transportation, or other places by way of an NFC-related application (e.g., an e-wallet application) installed on the electronic device, without the need for a physical card, as well as the functionality of a smart key or security card for accessing a home or business.

The card emulation mode may provide payment functionality and access to a building in a normal manner even when the electronic device is powered off.

However, when the electronic device conducts a software update or other operations, the NFC circuitry might not normally operate in the card emulation mode. For example, when a user brings his NFC-equipped electronic device close to a terminal installed in a bus in order to pay a fare while the electronic device is in the middle of updating software, they might not use the NFC functionality, thus leading to a failure to pay the fare. As another example, if a software update is underway in the electronic device when the user puts their NFC-equipped electronic device on a terminal installed on a door of his car or home, they may be denied entry due to the unavailability of NFC functionality.

The above information is presented as background information only to assist with an understanding of the disclosure. No determination has been made, and no assertion is made, as to whether any of the above might be applicable as prior art with regard to the disclosure.

SUMMARY

According to various embodiments, there may be provided a multimodal operation method and apparatus of NFC circuitry that provide the functionality of the card emulation mode.

According to an embodiment, an electronic device comprises a housing, a user interface at least partially accommodated by the housing, a power module positioned inside the housing, a near field communication (NFC) circuit positioned inside the housing and connected with the power module, the NFC circuit configured to perform at least some of a plurality of NFC operations based on an operation mode, an application processor positioned inside the housing and operatively connected with the user interface, the NFC circuit, or the power module, and a memory operatively connected with the application processor and that stores an operating system (OS), the memory storing instructions configured to, when executed, enable the application processor to, in response to receiving an update request, receive an update request to update the OS, update the OS while the normal operation of the electronic device is paused, provide a first control signal corresponding to the update to the NFC circuit operating in a first mode, and resume normal operation after the update of the OS is complete, and enable the NFC circuit to receive the first control signal while operating in the first mode, in response to receiving the first control signal, transition from the first mode to a second mode, and transition from the second mode to the first mode after the normal operation is resumed by the application processor.

According to an embodiment, an electronic device comprises a memory, a first communication circuit, a second communication circuit, and at least one processor operatively connected with the memory, the first communication circuit, or the second communication circuit, wherein the processor is configured to identify an occurrence of a designated event for the electronic device while at least one piece of first software stored in the memory is performed, in response to the occurrence of the designated event, receive update software for the at least one piece of first software from an external device through the second communication circuit, and update the at least one piece of first software using the received update software, and wherein the first communication circuit is configured to operate in a first mode before the at least one piece of first software is updated, and in response to performing the update of the at least one piece of first software, transition into a second mode.

According to an embodiment, there is provided a computer readable recording medium recording a program running on a computer, the program including executable instructions configured to, when executed by a processor, enable the processor to receive an update request for updating the OS of an electronic device, in response to receiving the update request, update the OS while the normal operation of the electronic device is paused, provide a first control signal corresponding to the update to an NFC circuit operating in a first mode, and resume normal operation after the update of the OS is complete, and to enable the NFC circuit to receive the first control signal while operating in the first mode, in response to the reception of the first control signal, transition from the first mode to a second mode, and transition from the second mode to the first mode after normal operation is resumed by the processor.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
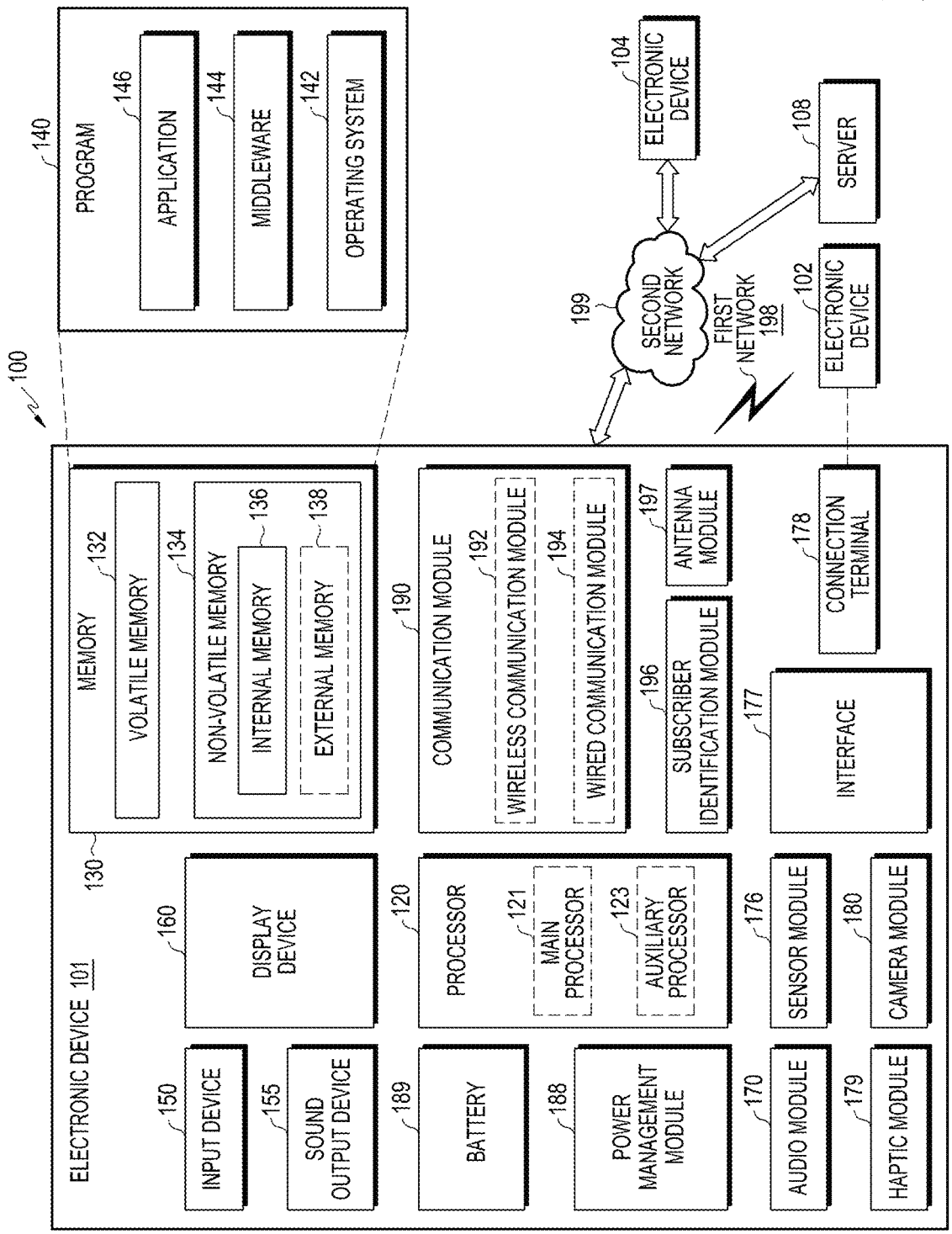
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, e.g., software (e.g., a program 140) to control at least one other component (e.g., a hardware or software component) of the electronic device 101 connected with the processor 120 and may process or compute various data. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) directly or wirelessly connected with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, e.g., a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or wireless communication channel between the electronic device 101 and an external electronic device (e.g., the electronic device 102, the electronic device 104, or the server 108) and performing communication through the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technique may be used, for example.

According to an embodiment, the processor 120 may control an NFC module (e.g., the NFC circuit) of the wireless communication module 192 to perform various operation modes to perform NFC. The various operation modes may include a first mode configured to read or write data, a second mode configured to emulate an NFC tag, and a third mode configured to deactivate the NFC circuit.

According to an embodiment, the first mode may be a standard mode to receive full power from the processor 120, the second mode may be an update mode to receive low power from the battery 189, and the third mode may be an uninitialized mode to deactivate the NFC circuit while the electronic device 101 receives the full power.

According to an embodiment, in the first mode (e.g., the standard mode), all NFC-related functions or operations (e.g., a plurality of NFC operations) may overall be performed through the NFC circuit. For example, the plurality of NFC operations may include a read data operation for reading NFC data or a write data operation for writing NFC data, such as, e.g., a transportation card, payment card, smart key card, or employee card through the NFC circuit (e.g., 293 of FIG. 2), a peer-to-peer (P2P) operation for performing inter-device communications for exchanging information, or a card emulation operation for emulating the NFC data.

According to an embodiment, in the second mode (e.g., the update mode), some of the plurality of NFC operations may be carried out through the NFC circuit. For example, in the second mode, the card emulation operation for emulating NFC data among the plurality of NFC operations may be performed while the NFC circuit updates the OS of the electronic device 101.

According to an embodiment, in the third mode (e.g., the uninitialized mode), the NFC circuit may be deactivated so that it may not be able to perform the plurality of NFC operations (e.g., the read data operation, the write data operation, the P2P operation, or the card emulation operation).

According to an embodiment, the processor 120 may start to update the OS while the normal operation of the electronic device 101 pauses upon receiving a user input through a user interface (e.g., the input device 150 (e.g., a microphone, mouse, or keyboard), the sound output device 155 (e.g., a speaker), a display device 160 (e.g., a display or touchscreen), or at least one sensor (e.g., the sensor module 176) that may be provided to update the OS stored in the memory 130. After receiving the user input, the processor 120 may provide a first control signal to the NFC circuit (e.g., the NFC module of FIG. 1), and after the OS update is complete, the processor 120 may resume the normal operation of the electronic device 101.

According to an embodiment, the NFC circuit operating in the first mode may transition from the first mode to the second mode in response to the reception of the first control signal, and after the normal operation of the electronic device is resumed, the NFC circuit may transition from the second mode back to the first mode.

According to an embodiment, the second mode may be the update mode in which the NFC circuit may perform the card emulation operation among the plurality of NFC operations until the electronic device 101 starts updating the OS, and the OS update is then complete after restarting the electronic device 101.

According to an embodiment, the processor 120 may start to update the software after downloading update software for updating the OS of the electronic device 101 from an external device. The processor 120 may provide the first control signal to the NFC circuit after starting the software update.

According to an embodiment, the processor 120 may restart the electronic device 101 after providing the first control signal to the NFC circuit. For example, the processor 120 may reboot the electronic device 101 by turning the electronic device 101 off and then back on.

According to an embodiment, after the paused the normal operation of the electronic device 101 is resumed by the processor 120, the NFC circuit may transition from the second mode to a third mode and may update the firmware of the NFC circuit while operating in the third mode.

According to an embodiment, the NFC circuit may receive full power through a PMIC (e.g., the power management module 188) from the application processor of the processor 120 in the first mode and may receive low power through the battery 189 in the second mode.

According to an embodiment, the processor 120 may receive a signal responsive to the first control signal from the NFC circuit and may restart the electronic device 101 in response to the reception of the response signal. According to an embodiment, the response signal may include information indicating whether the mode transition of the NFC circuit succeeds or fails. For example, when the response signal includes information indicating that the mode transition of the NFC circuit succeeds, the electronic device 101 may be rebooted and restarted. While rebooting the electronic device 101, the NFC circuit may operate in the second mode in which the card emulation operation for emulating NFC data is performed.

According to an embodiment, the processor 120 may provide a second control signal to the NFC circuit after resuming the paused normal operation of the electronic device 101. The NFC circuit may transition from the second mode to a third mode in response to the reception of the second control signal.

According to an embodiment, when the firmware update for the NFC circuit is complete while the NFC circuit operates in the third mode, the NFC circuit may transition from the third mode to the first mode.

Figure 2:
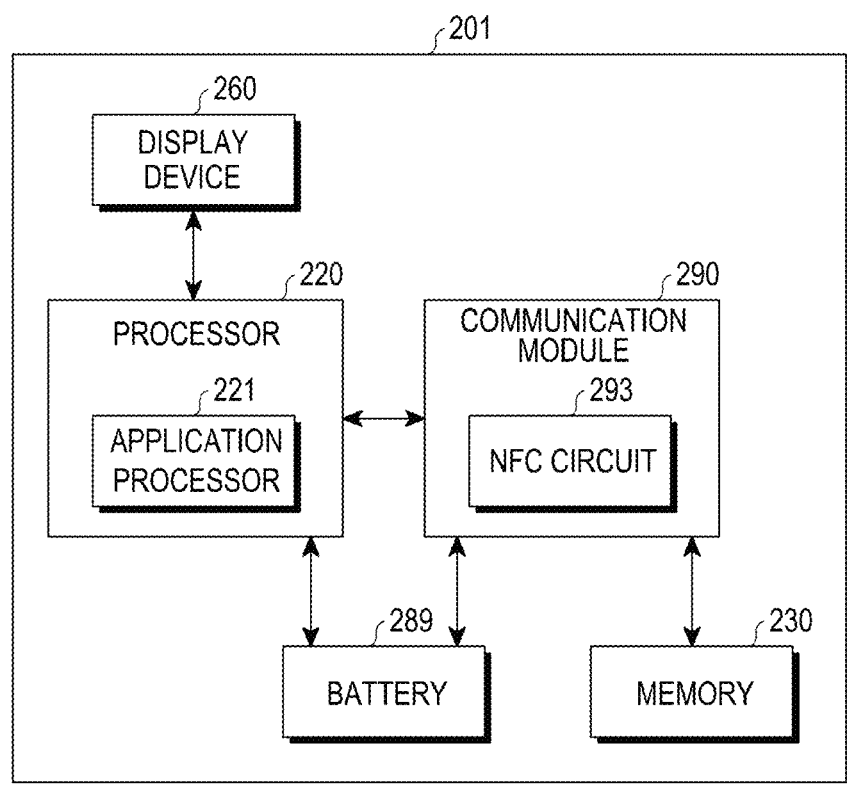
FIG. 2 is a block diagram illustrating an electronic device according to an embodiment.

FIG. 2 is a block diagram illustrating an electronic device according to an embodiment of the disclosure.

Referring to FIG. 2, an electronic device 201 (e.g., the electronic device 101 of FIG. 1) may include a processor 220 (e.g., the processor 120 of FIG. 1) including an application processor 221 (e.g., the application processor of FIG. 1), a memory 230 (e.g., the memory 130 of FIG. 1), a display device 260 (e.g., the display device 160 of FIG. 1), a battery 289 (e.g., the battery 189 of FIG. 1), and/or a communication module 290 (e.g., the communication module 190 of FIG. 1) including an NFC circuit 293 (e.g., the NFC module of FIG. 1).

According to an embodiment, when an update request regarding the electronic device 201 is generated while the NFC circuit 293 operates in a first mode (e.g., a standard mode), the application processor 221 may control the NFC circuit 293 to operate in a second mode (e.g., an update mode).

According to an embodiment, the update request regarding the electronic device 201 may be a request to update the operating system (OS) of the electronic device 201. According to an embodiment, the request may be generated upon meeting a designated condition (or occurrence of an event) or upon receiving a user input to update the OS of the electronic device 201.

For example, the application processor 221 may provide a user interface to inquire about whether to proceed with updating the OS of the electronic device 201 or to receive an update request. The user interface may inquire about whether to proceed with the update of the OS of the electronic device 201 or to receive a user input for update request using the input device 150 (e.g., a microphone, mouse, or keyboard), the sound output device 155 (e.g., a speaker), the display device 260 (e.g., a display or touchscreen), or at least one sensor (e.g., the sensor module 176). According to an embodiment, the user input may include a voice input received by the user's utterance using the input device 150 (e.g., a microphone), an input signal received by the user's physical or mechanical manipulation on the input device 150 (e.g., a mouse or keyboard), an input signal received by the user's touch, hovering, or various types of touch gestures (e.g., a double-tap, drag, drag-and-drop, swipe, or flick) on the display device 260 (e.g., a touchscreen), or an input signal received by the user's motion (or action) on at least one sensor (e.g., the sensor module 176).

For example, the application processor 221 may determine whether a designated condition is met (or a designated event occurs). According to an embodiment, the designated condition (or event) may include a designated time (e.g., a reserved time), a designated cycle (e.g., a reserved cycle), a designated place (e.g., a geographical location, administrative district, or the user's region of interest), a designated power status of the electronic device 201, or a designated communication status of the electronic device 201, or a combination thereof. For example, the designated time or cycle may previously be designated per month, day, or time. The designated place may previously be designated based on a geographical location, administrative district, or the user's region of interest (ROI). The designated power status may previously be designated based on the way the electronic device 201 is powered or the remaining power of the electronic device 201. For example, the power status for update may be designated based on either when the full power (e.g., a VDD) of the electronic device 201 is fed through a power management integrated circuit (PMIC) by the application processor 221 or when low power (e.g., a VBAT) is supplied from the battery 289 (e.g., the VBAT). Or, when the electronic device 201 is powered by the battery 289 (e.g., the VBAT), the power status for updating the electronic device 201 may previously be set to where the remaining power of the battery 289 is a designated threshold (e.g., about 80% to about 90% of the overall capacity of the VBAT) or more. The designated communication status may previously set a communication network where the NFC circuit 293 may communicate during the update of the electronic device 201. For example, the designated communication network may be a wireless-fidelity (Wi-Fi) network. According to an embodiment, the application processor 221 may determine that the designated event occurs (or the condition is met) when the electronic device 201 arrives at the designated time or cycle, enters the designated place, reaches the designated power status or designated communication status, or meets a combination thereof.

According to an embodiment, in response to the reception of the user input, the application processor 221 may pause its normal operation and transfer a control signal (e.g., a first control signal) to the NFC circuit 293 to allow the NFC circuit 293 to operate in the second mode (e.g., an update mode). According to an embodiment, in response to the designated event (or meeting the designated condition) occurring, the application processor 221 may pause its normal operation and transfer a control signal (e.g., a first control signal) to the NFC circuit 293 to allow the NFC circuit 293 to operate in the second mode (e.g., an update mode).

According to an embodiment, the normal operation of the electronic device 201 may mean all operations that may be conducted on the electronic device 201 by the user's intent. For example, the normal operation of the electronic device 201 may include turning the electronic device 201 on or off according to a user input or performing at least one function or application according to a user input. According to an embodiment, operations performed on the electronic device 201 based on the designated condition (or designated event) may not correspond to the normal operation of the electronic device 201. For example, updating the OS of the electronic device 201, rebooting the electronic device 201 for the update, or operations performed on the electronic device during the update based on the designated condition (or event) might not correspond to the normal operation of the electronic device 201.

According to an embodiment, the NFC circuit 293 may operate in various operation modes, including a first mode (e.g., a standard mode), a second mode (e.g., an update mode), a third mode (e.g., a uninitialized mode), or a fourth mode (e.g., a card emulation mode) under the control of the application processor 221 or based on the power status of the electronic device 201. The operation modes of the NFC circuit 293 are described below in greater detail with reference to FIG. 4.

According to an embodiment, the NFC circuit 293 may receive a control signal (e.g., a first control signal) for operating in the second mode (e.g., the update mode) from the application processor 221 while operating in the first mode (e.g., the standard mode). The NFC circuit 293 may transition from the first mode (e.g., the standard mode) to the second mode (e.g., the update mode) in response to the reception of the first control signal.

According to an embodiment, the NFC circuit 293 may transfer a signal (e.g., a first response signal) responsive to the first control signal to the application processor 221 based on at least part of the result of the transition from the first mode to the second mode.

According to an embodiment, the first response signal may include information indicating the success or failure of the mode transition (e.g., the transition from the first mode to the second mode) of the NFC circuit 293. For example, the NFC circuit 293 may perform the transition from the first mode to the second mode according to the first control signal. When the transition from the first mode to the second mode succeeds, the NFC circuit 293 may operate in the second mode and may transfer a response signal (e.g., the first response signal) that includes information indicating that the mode transition has succeeded to the application processor 221. When the transition from the first mode to the second mode fails, the NFC circuit 293 may continue to operate in the first mode and may transfer a response signal (e.g., the first response signal) including information indicating that the mode transition has failed to the application processor 221.

According to an embodiment, the NFC circuit 293 may perform at least one of all functions or operations (e.g., NFC operations) related to near field operations supported by the NFC circuit 293. According to an embodiment, the plurality of NFC operations supported by the NFC circuit 293 may include at least one of a read operation for reading NFC data or a write data operation for writing NFC data, such as, e.g., a transportation card, payment card, smart key card, or employee card, through the NFC circuit 293 or a card emulation operation for emulating the NFC data.

According to an embodiment, the first mode may be a standard mode for performing at least one operation from the plurality of NFC operations. The second mode may be an update mode for performing some of the operations of the plurality of NFC operations while the application processor 221 updates the OS.

According to an embodiment, in the first mode, the plurality of NFC operations may all be activated to be performed, and in the second mode, a particular operation (e.g., the card emulation operation for emulating NFC data) among the plurality of NFC operations may be activated while the application processor 221 updates the OS.

According to an embodiment, in the first mode, some of the plurality of NFC operations may be activated while others are not. In the second mode, the operations activated in the first mode may be deactivated while the operations deactivated in the first mode may be activated. For example, in the first mode, the read data operation for reading NFC data, the write data operation for writing NFC data or the P2P operation for performing inter-device communications among the plurality of NFC operations may be activated while the card emulation operation for emulating NFC data may be deactivated. In the second mode, the card emulation operation for emulating NFC data among the plurality of NFC operations may be activated while the read data operation for reading NFC data, the write data operation for writing NFC data or the P2P operation for performing inter-device communications may be deactivated.

According to an embodiment, the application processor 221 may start an update on the electronic device 201 and may reboot the electronic device 201 while the NFC circuit 293 operates in the second mode (e.g., the update mode). For example, the application processor 221 may receive a signal (e.g., the first response signal) responsive to the first control signal from the NFC circuit 293. In response to the reception of the response signal (e.g., the first response signal), the application processor 221 receives software for updating the OS of the electronic device 201 from an external device, and when the software reception (e.g., download) from the external device is complete, the application processor 221 may power the electronic device 201 off and then on.

According to an embodiment, the application processor 221 may resume the normal operation of the electronic device 201 after completing the reboot of the electronic device 201 and the OS update. While resuming and performing the normal operation of the electronic device 201, the application processor 221 may control the NFC circuit 293 to operate in the third mode (e.g., the uninitialized mode). For example, the application processor 221 may transmit a control signal mode to the NFC circuit 293 (e.g., a second control signal) to allow the NFC circuit 293 to operate in an uninitialized.

According to an embodiment, when an update event related to the electronic device 201 occurs, the application processor 221 may transmit a first control signal to the NFC circuit 293 in order to transition the operation mode of the NFC circuit 293 from the standard mode to the update mode. For example, the update-related event may be created by a user input for updating the OS of the electronic device 201 when a designated condition for updating the OS is met (e.g., when a preset reservation time arrives).

According to an embodiment, the application processor 221 may receive a signal responsive to the first control signal from the NFC circuit 293. The application processor 221 may restart the electronic device 201 in response to the reception of the response signal. According to an embodiment, the response signal may include information indicating whether the mode transition of the NFC circuit 293 succeeds or fails. According to an embodiment, upon receiving a response signal indicating that the mode transition from the first mode to the second mode succeeds according to the first control signal from the NFC circuit 293, the application processor 221 may reboot the electronic device 201.

According to an embodiment, upon receiving a response signal indicating that the mode transition from the first mode to the second mode fails according to the first control signal from the NFC circuit 293, the application processor 221 may provide information to indicate the failure of the mode transition through the display device 260.

According to an embodiment, when the mode transition of the NFC circuit 293 fails, the application processor 221 may reboot the electronic device 201 to update the electronic device 201 without the NFC circuit 293 transitioning into the second mode in response to a user input or the application processor 221 may re-transmit a control signal (e.g., the first control signal) to allow the NFC circuit 293 to transition into the second mode or cancel the update of the electronic device 201. For example, the application processor 221 may provide, through the display device 260, a user interface to cancel the update of the electronic device 201, disregard the mode transition of the NFC circuit 293, or reattempt the mode transition.

According to an embodiment, when the electronic device 201 resumes normal operation after the rebooting and updating of the electronic device 201 is complete, the application processor 221 may transmit a second control signal to the NFC circuit 293 in order to transition the operation mode of the NFC circuit 293 into the third mode (e.g., the uninitialized mode). The application processor 221 may receive a signal responsive to the second control signal from the NFC circuit 293. In response to the reception of the signal responsive to the second control signal from the NFC circuit 293, the application processor 221 may provide an NFC-related user interface through the input device 150 (e.g., a microphone, mouse, or keyboard), the sound output device 155, the display device 260, or at least one sensor (e.g., the sensor module 176).

According to an embodiment, the memory 230 may store various pieces of information used on the electronic device 201. The memory 230 may include a normal storage area and/or a security enhancement (SE) area for storing security-required information. NFC-related data (e.g., personal information, payment information, or authentication information) may be stored in the SE area.

According to an embodiment, the user interface may provide the user with various NFC-related contents (e.g., text, images, videos, icons, symbols, or other graphical objects or voice or other various sounds) through the input device 150 (e.g., a microphone, mouse, or keyboard), the sound output device 155, the display device 260, or at least one sensor (e.g., the sensor module 176). For example, the display device 260 or the sound output device 155 (e.g., a speaker) may display or output a user interface for disregarding the mode transition of the NFC circuit 293, canceling the update of the electronic device 201, or reattempting the mode transition upon failing the mode transition of the NFC circuit 293.

According to an embodiment, a power module (e.g., the PMIC of the power management module 188 or the battery 289) may supply power to the application processor 221 or the NFC circuit 293. For example, the power module may supply full power (e.g., VDD) or low power (e.g., VBAT) to the application processor 221 or the NFC circuit 293 through the PMIC or the battery 289. According to an embodiment, the application processor 221 may supply full power (e.g., VDD), which is provided from the PMIC of the power module, to the NFC circuit 293 or low power (e.g., VBAT), which is provided from the battery 289, to the NFC circuit 293. According to an embodiment, the battery 289 may supply low power (e.g., VBAT) to the NFC circuit 293 when the electronic device 201 turns off or when the supply of full power (e.g., VDD) to the NFC circuit 293 pauses.

According to an embodiment, upon receiving the first control signal from the application processor 221 while operating in the first mode, the NFC circuit 293 may transition from the first mode to the second mode.

According to an embodiment, the NFC circuit 293 may transmit a response signal indicating whether the mode transition from the first mode to the second mode succeeds or fails to the application processor 221 in response to the first control signal.

According to an embodiment, upon receiving the second control signal while operating in the second mode, the NFC circuit 293 may transition from the second mode to the third mode and may identify whether the firmware for the NFC circuit 293 is updated while operating in the third mode. Whether there is a firmware update for the NFC circuit 293, the NFC circuit 293 updates the firmware for the NFC circuit 293, and when the firmware update is done, the NFC circuit may proceed with initialization and transition from the third mode to the first mode. When there is no firmware update for the NFC circuit 293, the NFC circuit 293 may proceed with initialization, and then immediately transition from the third mode to the first mode.

According to an embodiment, an electronic device 201 may comprise a housing, a user interface (e.g., the input device 150 (e.g., a microphone, mouse, or keyboard), the sound output device 155 (e.g., a speaker), the display device 260 (e.g., a display or touchscreen), or at least one sensor (e.g., the sensor module 176)) at least partially accommodated by the housing, a power module (e.g., a PMIC of the power management module 188 or the battery 289) positioned inside the housing, a near field communication (NFC) circuit 293 positioned inside the housing and connected with the power module, an application processor 221 positioned inside the housing and operatively connected with the user interface, the NFC circuit 293, and the power module, and a memory 230 operatively connected with the application processor 221 and that stores an operating system (OS). The memory 230 may store instructions configured to, when executed, enable the application processor 221 to receive a user input to update the OS, in response to the reception of the user input, update the OS while a normal operation of the electronic device 201 is paused, provide a first control signal corresponding to the update to the NFC circuit 293 operating in a first mode, and resume normal operation after the update of the OS is complete, and enable the NFC circuit 293 to receive the first control signal while operating in the first mode, in response to the reception of the first control signal, transition from the first mode to a second mode, and transition from the second mode to the first mode after normal operation is resumed by the application processor 221.

According to an embodiment, the electronic device 201 may include a memory 230, a first communication circuit and a second communication circuit included in a communication module 290, and at least one processor 220 (e.g., the application processor 221). For example, the at least one processor 220 (e.g., the application processor 221) may be operatively connected with the memory 230, the first communication circuit, and the second communication circuit. The at least one processor 220 (e.g., the application processor 221) may identify the occurrence of a designated event for the electronic device 201 while at least one piece of first software stored in the memory 230 is executed. The at least one processor 220 (e.g., the application processor 221) may be configured to receive update software for the at least one piece of first software through the second communication circuit from an external device in response to the occurrence of the designated event and may be configured to update the at least one piece of first software using the received update software. The first communication circuit may be configured to operate in the first mode before updating the at least one piece of first software and may be configured to transition into the second mode in response to updating the at least one piece of first software.

According to an embodiment, the designated event may include a designated time, a designated cycle, a designated power status, a designated communication status, or a combination thereof.

According to an embodiment, the electronic device 201 may further include a display device 260, a sensor (e.g., the sensor module 176), and a microphone. The processor 220 (e.g., the application processor 221) may be configured to perform the update in response to receiving a user input through at least one of the display device 260, the sensor 176, or the microphone.

According to an embodiment, the first communication circuit may include at least one NFC circuit 293 communicating with the external device through an NFC network, and the second communication circuit may include at least one remote communication circuit communicating with the external device through a remote communication network.

Figure 3:
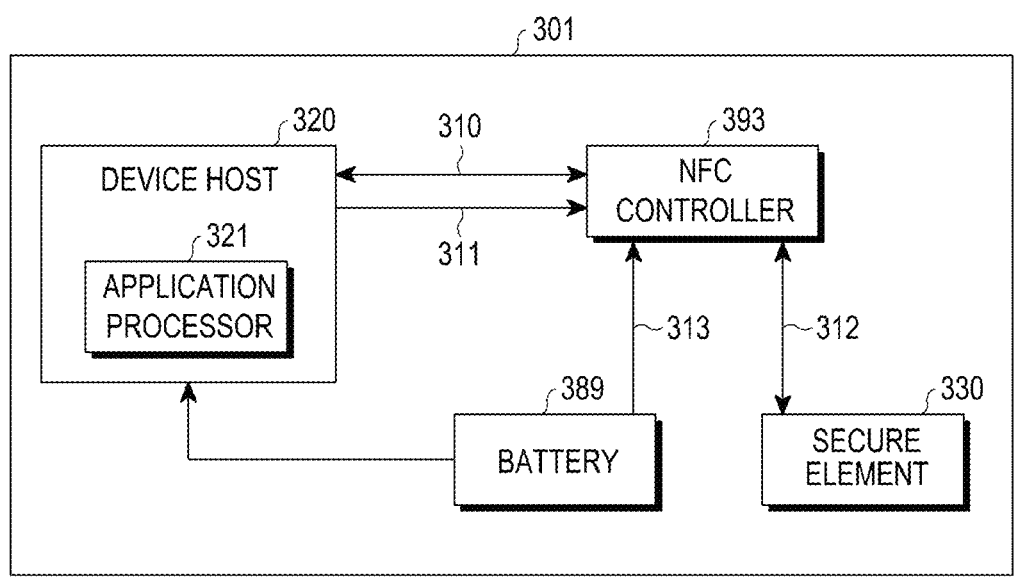
FIG. 3 is a block diagram illustrating a configuration of an electronic device according to an embodiment.

FIG. 3 is a block diagram illustrating an electronic device according to an embodiment.

Referring to FIG. 3, an electronic device 301 (e.g., the electronic device 101 of FIG. 1 or the electronic device 201 of FIG. 2) may include a device host 320 (e.g., the processor 120 of FIG. 1 or the processor 220 of FIG. 2) including an application processor 321, a secure element 330 (e.g., the memory 130 of FIG. 1 or the memory 230 of FIG. 2), a battery 389 (e.g., the battery 189 of FIG. 1 or the battery 289 of FIG. 2), and/or an NFC controller 393 (e.g., a communication processor or sensor hub processor of the auxiliary processor 123 or NFC module of FIG. 1 or the communication circuit 293 of FIG. 2).

According to an embodiment, the application processor 321 may control various functions of the electronic device 301 and may control the functions of the NFC controller 393. The application processor 321 may transfer NFC-related information to the NFC controller 393. For example, the NFC-related information may include at least one of the functionality of the application package (e.g., an ANDROID application package (apk)), the location of the application package installed in the electronic device 301, settings related to the functionality of the application package, and/or the type of secure elements (e.g., embedded SE or universal integrated circuit card (UICC)) that the application package uses.

According to an embodiment, the application processor 321 may transfer control signals to the NFC controller 393 or receive response signals from the NFC controller 393 through an NFC controller interface (NCI) 310.

According to an embodiment, the application processor 321 may control the NFC controller 393 to operate in full power when receiving full power from the battery 389. For example, the application processor 321 may control the NFC controller 393 to operate in a first mode (e.g., the standard mode) to perform a read data operation for reading NFC data, a write data operation for writing NFC data, a P2P operation for performing inter-device communications, the card emulation operation for emulating NFC data, or other NFC-related standard operations (e.g., a first NFC operation).

According to an embodiment, the application processor 321 may supply power through the voltage drain (VDD) 311, which is provided from the PMIC (e.g., the power management module 188)), to enable the NFC controller 393 to operate in the first mode (e.g., the standard mode). For example, when the VDD 311 is high, the electronic device 301 may be determined to be powered on, and when the VDD 311 is low, the electronic device 301 may be determined to be powered off.

When the electronic device 301 powers off, e.g., when the supply of power from the battery 389 to the application processor 321 is cut off, the supply of power (e.g., full power) to the NFC controller 393 by the application processor 321 may be cut off.

According to an embodiment, when an event for updating the OS of the electronic device 301 occurs, the application processor 321 may pause the normal operation of the electronic device 301 and may transfer a control signal (e.g., the first control signal) to the NFC controller 393 to allow the NFC controller 393 to operate in the second mode (e.g., the update mode) while the electronic device 301 pauses normal operation. For example, the event may include when the OS of the electronic device 301 is chosen to be updated by a user input or when a designated condition (e.g., a designated time, a designated cycle, a designated power status, a designated communication status, or a combination thereof) is met.

Upon receiving a response signal indicating that the transition from the first mode (e.g., the standard mode) to the second mode (e.g., the update mode) succeeds from the NFC controller 393, the application processor 321 may start to update the OS of the electronic device 301 to reboot the electronic device 301. For example, the application processor 321 may download the software for updating the OS of the electronic device 301 from an external device. When the software download is complete, the application processor 321 may start to update the software and turn the electronic device 301 off and then on.

Upon receiving a response signal indicating that the mode transition from the first mode (e.g., the standard mode) to the second mode (e.g., the update mode) fails from the NFC controller 393, the application processor 321 may provide a user interface to perform the update while disregarding the operation for transitioning the NFC controller 393 into the second mode (e.g., the update mode), retransfer a control signal (e.g., the first control signal) for transition into the second mode (e.g., the update mode), or cancel the update. Upon receiving a user input through the user interface, the application processor 321 may perform the OS update without the NFC controller 393 transitioning into the second mode (e.g., the update mode), retransfer the control signal (e.g., the first control signal) for transitioning the operation mode of the NFC controller 393 into the second mode (e.g., the update mode), or cancel the OS update.

After the electronic device 301 powers on, the application processor 321 may complete the software update, and after the update is complete, the application processor 321 may resume the normal operation of the electronic device 301. While the normal operation of the electronic device 301 resumes and runs, the application processor 321 may transmit a control signal (e.g., a second control signal) to the NFC controller 393 to allow the NFC controller 393 to operate in a third mode (e.g., the uninitialized mode). Upon receiving a response signal indicating a transition from the third mode (e.g., the uninitialized mode) to the first mode (e.g., the standard mode) from the NFC controller 393, the application processor 321 may provide a user interface to provide various NFC-related functions or operations.

According to an embodiment, the secure element 330 may be connected with the NFC controller 393 via a single wire protocol (SWP) 312 and may store data requiring NFC-related security. For example, the data may include at least part of personal information, payment information, or authentication information used in an NFC-related application installed on the electronic device 301.

According to an embodiment, the battery 389 may supply full power to the application processor 321 and may supply low power to the NFC controller 393 through the voltage of battery (VBAT) 313.

According to an embodiment, the NFC controller 393 may perform various NFC-related operations. While the full power (e.g., VDD) is supplied from the application processor 321, the NFC controller 393 may operate in the first mode (e.g., the standard mode) in which it may perform a plurality of NFC operations supported by the NFC controller 393 (e.g., at least one of a read data operation for reading NFC data, a write data operation for writing data, a P2P operation for performing inter-device communications, or a card emulation operation for emulating NFC data).

According to an embodiment, upon receiving a control signal (e.g., the first control signal) to operate in the second mode (e.g., the update mode) from the application processor 321, the NFC controller 393 may transition its operation mode into the second mode (e.g., the update mode) in which it may perform some (e.g., the card emulation operation) among the plurality of NFC operations. For example, the second mode (e.g., the update mode) may be an operation mode to allow the NFC controller 393 to operate at least partially similar to the card emulation mode, in which the NFC controller 393 may operate with the low power received from the battery 389, while the electronic device 301 performs the operation for updating the OS. When the electronic device 301 is powered off while the NFC controller 393 operates in the second mode (e.g., the update mode), the supply of power (e.g., VDD) through the PMIC from the application processor 321 may be cut off. Thus, the supply of full power from the application processor 321 to the NFC controller 393 may be cut off, and low power (e.g., VBAT) may be supplied from the battery 389 to the NFC controller 393. Thereafter, even when the electronic device 301 is powered on and full power (e.g., VDD) is supplied from the application processor 321 through the PMIC, the NFC controller 393 may be operated in the second mode (e.g., the update mode).

Upon receiving a control signal (e.g., the second control signal) to operate in the third mode (e.g., the uninitialized mode) from the application processor 321, the NFC controller 393 may transition from the second mode (e.g., the update mode) to the third mode (e.g., the uninitialized mode). The NFC controller 393 may update the firmware related to the NFC controller 393 and/or perform initialization (or booting) while operating in the third mode. For example, the NFC controller 393 may identify whether there is a firmware update for the NFC controller 393 by the OS update for the electronic device 301. When there is a firmware update, the NFC controller 393 may update the firmware, and if there is no firmware update, the NFC controller 393 may immediately perform initialization. When the firmware update and/or initialization are complete, the NFC controller 393 may transition from the third mode (e.g., the uninitialized mode) to the first mode (e.g., the standard mode) and transmit a response signal indicating the mode transition into the first mode (e.g., the standard mode) to the application processor 321.

Figure 4:
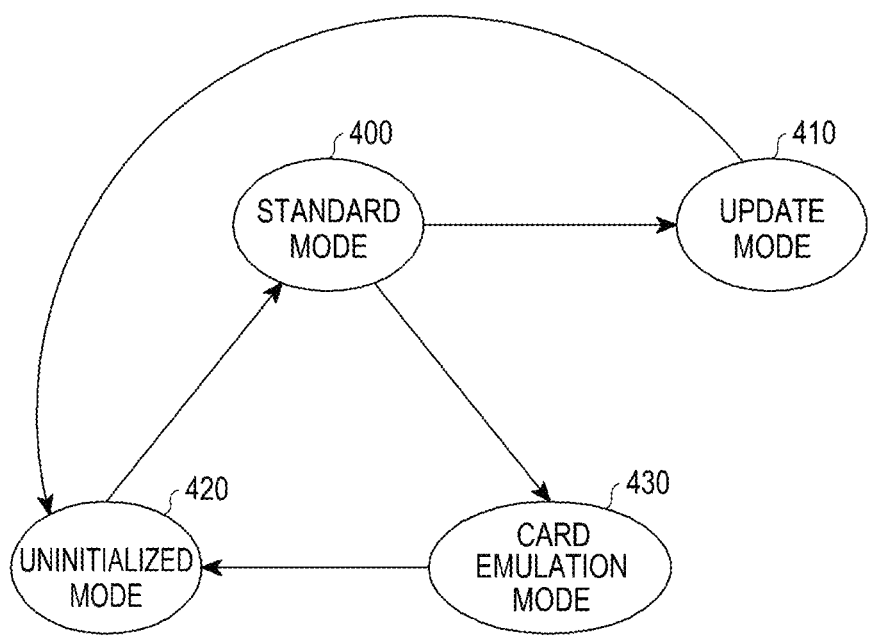
FIG. 4 is a view illustrating an example of an operation mode of an NFC circuit according to an embodiment.

FIG. 4 is a view illustrating an example of an operation mode of an NFC circuit according to an embodiment.

Referring to FIG. 4, operation modes of an NFC controller 393 (e.g., the NFC module of FIG. 1 or the NFC circuit 293 of FIG. 2) may include a standard mode 400, an update mode 410, an uninitialized mode 420, and a card emulation mode 430.

While the application processor 321 (e.g., the application processor of FIG. 1 or the application processor 221 of FIG. 2) supplies full power (e.g., VDD), which has been delivered through the power management module (e.g., the power management module 188) to the NFC controller 393, the NFC controller 393 may operate in the standard mode 400 in which all of the plurality of NFC operations (e.g., at least one of a read data operation for reading NFC data, a write data operation for writing NFC data, a P2P operation for performing inter-device communications, or a card emulation operation for emulating NFC data) may be performed. For example, when the electronic device 301 (e.g., the electronic device 101 of FIG. 1 or the electronic device 201 of FIG. 2) is powered off while the NFC controller 393 operates in the standard mode 400, the supply of full power (e.g., VDD), which is delivered from the application processor 321 through the power management module 188 to the NFC controller 393 is cut off, and low power (e.g., VBAT), which is delivered from the battery 389 to the NFC controller 393 may be supplied. When low power (e.g., VBAT) is supplied from the battery 389, the NFC controller 393 may transition from the standard mode 400 to the card emulation mode 430 for emulating NFC data. Accordingly, the user may perform payment or user authentication on NFC through the NFC controller 393 while the electronic device 301 remains powered off.

According to an embodiment, when the display device (e.g., the display device 260) of the electronic device 301 is activated (e.g., powered on) while operating in the standard mode 400, the NFC controller 393 may perform any of the first NFC operations, and when the display device 260 is deactivated (e.g., powered off), the NFC controller 393 may perform only some (e.g., the card emulation operation for emulating NFC data) of the first NFC operations.

According to an embodiment, when the electronic device 301 is powered back on while the NFC controller 393 operates in the card emulation mode 430, the application processor 321 may keep on supplying low power (e.g., VBAT) from the battery 389 to the NFC controller 393. The application processor 321 may transmit a control signal for allowing the NFC controller 393 to operate in the uninitialized mode 420 to the NFC controller 393. Receiving the control signal, the NFC controller 393 may transition from the card emulation mode 430 to the uninitialized mode 420, performing booting. When the booting is complete, the NFC controller 393 may transition from the initialized mode 420 to the standard mode 400.

According to an embodiment, upon receiving a user input to update the OS of the electronic device 301 or meeting a designated condition (or when an event occurs), the application processor 321 may transmit a control signal (e.g., the first control signal) for allowing the NFC controller 393 to transition into the update mode 410 to the NFC controller 393. Upon receiving a control signal (e.g., the first control signal), the NFC controller 393 may transition from the standard mode 400 for performing the first NFC operation (e.g., at least one of the read data operation for reading NFC data, the write data operation for writing NFC data, the P2P operation for performing inter-device communications, or the card emulation operation for emulating NFC data) to the update mode 410 for performing the second NFC operation (e.g., the card emulation operation for emulating NFC data). Thus, the user may perform payment or user authentication on NFC through the NFC controller 393 while the electronic device 301 updates the software for updating the OS of the electronic device 301.

According to an embodiment, the application processor 321 may download update software for updating the OS according to a request an update for the OS of the electronic device 301. The update request may be received by an input from the user or may automatically be created and received when a designated condition is met (or an event occurs). The application processor 321, upon receiving the update request, may manually or automatically download the update software for updating the OS of the electronic device 301 from the external device.

According to an embodiment, the application processor 321 may manually download the update software according to the received user input. For example, the application processor 321, upon receiving a request to update the OS of the electronic device 301, may provide a user interface including information containing an inquiry (e.g., a first inquiry) (e.g., "Do you want to download the update software?") as to whether to download the update software for updating the OS. The application processor 321 may receive a response to the first inquiry from the user through the user interface. For example, the information including the first inquiry provided through the user interface may include buttons or icons (e.g., "Yes" or "Download" and "No" or "Download later") to respond to the inquiry. Upon receiving a response (e.g., a first response) corresponding to "Yes" or "Download" in response to the first inquiry, the application processor 321 may download the update software for the electronic device 301. Upon receiving a response (e.g., a first response) corresponding to "No" or "Download later" in response the first inquiry, the application processor 321 may terminate the update of the electronic device 301 without downloading the update software for the electronic device 301.

According to an embodiment, the application processor 321 may automatically download the update software. For example, upon receiving the request to update the OS of the electronic device 301, the application processor 321 may automatically download the update software for updating the OS of the electronic device 301. For example, when the designated condition is set to connection to Wi-Fi, the application processor 321 may automatically download the update software from the external device when connected to Wi-Fi.

According to an embodiment, while the update software is downloaded, the application processor 321 may maintain the normal operation of the electronic device 301.

According to an embodiment, when the update software is completely downloaded, the application processor 321 may start to update the OS of the electronic device 301.

According to an embodiment, when the update software is completely downloaded, the application processor 321 may manually start to update the OS. For example, when the update software is completely downloaded, the application processor 321 may manually start to update the OS so that the downloaded update software is installed based on a user input received through the user interface.

For example, when the update software is completely downloaded, the application processor 321 may provide a user interface including information containing an inquiry (e.g., a second inquiry) (e.g., "Do you want to install the downloaded update software?") as to whether to install the downloaded update software. The application processor 321 may receive a response to the second inquiry from the user through the user interface. For example, the information including the second inquiry provided through the user interface may include buttons or icons (e.g., "Yes" or "Install now" and "No" or "Install later") to respond to the inquiry.

Upon receiving a response (e.g., a second response) corresponding to "Yes" or "Install now") in response to the second inquiry, the application processor 321 may start to update the OS of the electronic device 301 so that the downloaded update software is installed. Upon receiving a response (e.g., a second response) corresponding to "No" or "Install later") in response to the second inquiry, the application processor 321 may terminate the OS update for the electronic device 301 to prevent the downloaded update software from being installed.

According to an embodiment, the application processor 321 may automatically install the downloaded update software. For example, when the update software for updating the OS of the electronic device 301 is completely downloaded, the application processor 321 may automatically install the downloaded update software.

For example, upon receiving the update request for the OS of the electronic device 301, the application processor 321 may automatically start to update the OS of the electronic device 301 so that the update software is automatically downloaded and installed.

According to an embodiment, the application processor 321, upon receiving the update request for the OS of the electronic device 301, may manually start to update the OS of the electronic device 301 so that the update software is manually downloaded by a user input (e.g., a first response) received through the user interface, and the downloaded update software is installed by a user input (e.g., a second response) received through the user interface.

For example, upon receiving the update request for the OS of the electronic device 301, the application processor 321 may manually start to update the OS of the electronic device 301 so that the update software is manually downloaded by the user input (e.g., the first response), and the downloaded update software is installed.

According to an embodiment, the application processor 321, upon receiving the update request for the OS of the electronic device 301, may manually start to update the OS of the electronic device 301 so that the update software is automatically downloaded, and the downloaded update software is installed by a user input (e.g., the second response) received through the user interface.

According to an embodiment, upon receiving the request to update the OS of the electronic device 301, the application processor 321 may automatically start to update the OS of the electronic device 301 so that the update software is manually downloaded by the user input (e.g., the first response), and the downloaded update software is installed.

According to an embodiment, when the update of the OS of the electronic device 301 starts to install the downloaded update software, the application processor 321 may provide a control signal (e.g., a first control signal) for controlling the NFC controller 393 to transition from the standard mode 400 to the update mode 410 to the NFC controller 393 and may then start to update the software and reboot the electronic device 301. For example, the application processor 321 may power the electronic device 301 off and then on, rebooting the electronic device 301. When the software update is complete after the electronic device 301 is rebooted, the application processor 321 may resume and perform the normal operation of the electronic device 301.

According to an embodiment, upon reception of the first control signal from the application processor 321, the NFC controller 393 may transition from the standard mode 400 to the update mode 410 according to the first control signal and may then operate in the update mode 410 until the software update is complete. According to an embodiment, the update mode 400 may include a first update mode based on a first setting or a second update mode based on a second setting. For example, the NFC controller 393 may operate in the first update mode for performing a particular operation (e.g., the card emulation operation for emulating NFC data) among the plurality of NFC operations based on at least part of the first setting until before the electronic device 301 is powered off to reboot the electronic device 301 after transitioning into the update mode 400 or until the software update is complete after the electronic device 301 is powered back on. The NFC controller 393 may operate in the second update mode for performing a second NFC operation (e.g., the card emulation operation for emulating NFC data) based on at least part of the second setting until the electronic device 301 is powered back on after having been powered off for rebooting.

According to an embodiment, the first setting may include a first power setting configured to supply full power (e.g., VDD), which is delivered from the application processor 321 to the power management module 188, to the NFC controller 393, and the second setting may include a second power setting configured to supply low power (e.g., VBAT), which is delivered from the battery 389, to the NFC controller 393.

According to an embodiment, while resuming and performing the normal operation of the electronic device 301, the application processor 321 may transmit a control signal (e.g., a second control signal) to the NFC controller 393 for allowing the NFC controller 393 to transition into the uninitialized mode. Receiving the control signal (e.g., the second control signal), the NFC controller 393 may transition from the update mode 410 to the uninitialized mode 420 and perform a firmware update and/or initialization related to the NFC controller 393. For example, when there is firmware to be updated related to the NFC controller 393 operating in the uninitialized mode 420, the NFC controller 393 may update the firmware for the NFC controller 393, and when the firmware update is complete, the NFC controller 393 may perform the initialization. When the initialization is complete, the NFC controller 393 may transition from the uninitialized mode 420 to the standard mode 400 and may transmit a signal responsive to the mode transition from the uninitialized mode 420 to the standard mode 400 to the application processor 321.

Figure 5:
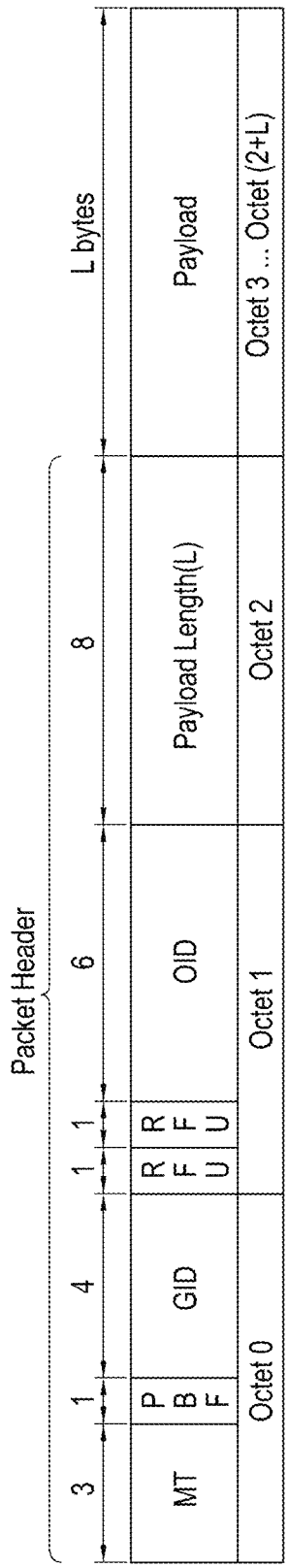
FIG. 5 is a view illustrating a configuration of a packet for a control signal according to an embodiment.

FIG. 5 is a view illustrating a configuration of a packet for a control signal according to an embodiment.

Referring to FIG. 5, the packet architecture may include a message type (MT), a packet boundary flag (PBF), a group identifier (GID), an operational code (opcode) identifier (OID), a payload length (L), and/or a payload.

According to an embodiment, each element constituting the packet for the control signal may be defined as shown in Table 1 below:

TABLE 1

| Element | value | description |
| --- | --- | --- |
| MT | 001b | command message |
| PBF | 0b | Complete message |
| GID | 111b | Proprietary payload |
| OID | 110111b | transition to update mode |
| L | 0x01 | Payload length: 1 |
| Payload | 0x00 | 0x00: release update mode and transition into uninitialized mode |
| | 0x01 | 0x01: enter update mode |

The control signal configured as above may be delivered from the application processor 321 to the NFC controller 393. For example, upon receiving a user input for updating the OS of the electronic device 301 or meeting a designated condition (or when an event occurs), the application processor 321 may transmit a control signal (e.g., a first control signal) including "0x01" for entering the update mode to the NFC controller 393. While resuming and performing the normal operation of the electronic device 301 after the update is complete, the application processor 321 may release the update mode of the NFC controller 393 and transmit a control signal (e.g., a second control signal) including "0x00" for transitioning into the uninitialized mode to the NFC controller 393. Upon receiving the control signal (e.g., the first control signal) including "0x01," the NFC controller 393 may transition from the standard mode to the update mode, and upon receiving the control signal (e.g., the second control signal) including "0x00," the NFC controller 393 may transition from the update mode to the uninitialized mode.

The NFC controller 393 may transmit a signal responsive to the control signal (e.g., the first control signal or the second control signal) to the application processor 321. Each element constituting the packet for the response signal may be defined as shown in Table 2 below:

TABLE 2

| element | value | Description |
| --- | --- | --- |
| MT | 001b | response message |
| PBF | 0b | Complete message |
| GID | 111b | Proprietary payload |
| OID | 110111b | transition to update mode |
| L | 0x01 | Payload length: 1 |
| payload | 0x00 | 0x00: NCI_STATUS_OK |
| | 0x01 | 0x01: NCI_STATUS_REJECTED |

The response signal configured as above may be delivered from the NFC controller 393 to the application processor 321. For example, when the mode transition from the standard mode to the update mode succeeds, the NFC controller 393 may transmit a response signal including "0x00" to the application processor 321, and when the mode transition fails, the NFC controller 393 may transmit a response signal including "0x01" to the application processor 321. Upon receiving the response signal including "0x00," the application processor 321 may reboot the electronic device 301, and upon receiving the response signal including "0x01," the application processor 321 may provide a user interface for canceling, disregarding, or reattempting the transition into the update mode. According to an embodiment, the user interface may receive various types of user inputs using an input module (e.g., the input device 150 (e.g., a microphone, mouse, or keyboard), the display device 260 (e.g., a display or touchscreen), or at least one sensor (e.g., the sensor module 176)).

Figure 6:
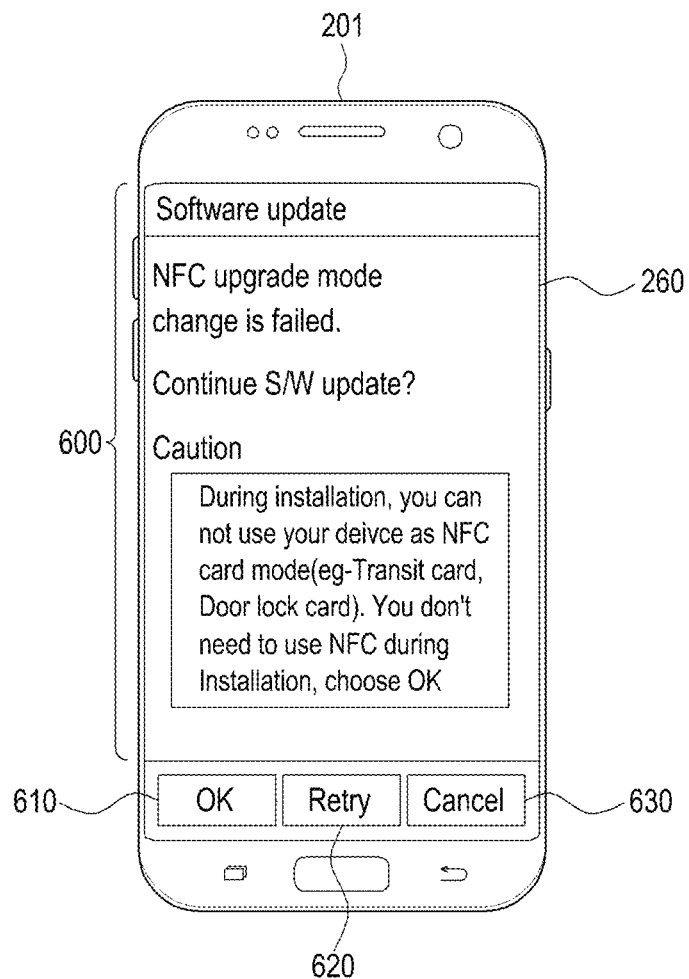
FIG. 6 is a view illustrating a user interface provided upon failing to transition modes according to an embodiment.

FIG. 6 is a view illustrating a user interface provided upon failing to transition modes according to an embodiment.

Referring to FIG. 6, an application processor 221 (e.g., the application processor of FIG. 1 or the application processor 321 of FIG. 3) may transmit a control signal (e.g., a first control signal) for allowing an NFC circuit 293 (e.g., the NFC module of FIG. 1 or the NFC controller 393 of FIG. 3) to transition into the update mode to the NFC circuit 293 based on an event for updating the OS of an electronic device 201 (e.g., the electronic device 101 of FIG. 1 or the electronic device 301 of FIG. 3). Upon receiving a response signal indicating that the mode transition fails from the NFC circuit 293, the application processor 221 may indicate that the NFC circuit 293 has failed to transition into the update mode and may provide a user interface including information for inquiring whether to proceed to update the OS software through the input device 150 (e.g., a microphone, mouse, or keyboard), the sound output device 155 (e.g., a speaker), the display device 260 (e.g., a display or touchscreen), or at least one sensor (e.g., the sensor module 176). For example, the user interface may include first graphic objects (e.g., text, images, icons, or widgets) corresponding to information for indicating that the NFC circuit 293 fails to transition into the update mode, information to inquire whether to go on with the software update, and information indicating that the functionality of NFC would be unavailable when the software update proceeds without the NFC circuit 293 transitioning into the update mode. The user interface may include second graphic objects (e.g., a first icon 610, a second icon 620, and/or a third icon 630) corresponding to functions for proceeding with the software update with the mode transition failing, reattempting the mode transition, or canceling the software update. According to an embodiment, the user interface may provide a voice corresponding to the first graphic objects (e.g., text, images, icons, or widgets) 600 using the sound output device 155 (e.g., a speaker) or may receive a voice, as a user input, corresponding to the second graphic objects (e.g., the first icon 610, the second icon 620, and/or the third icon 630) using the microphone of the input device 150.

According to an embodiment, when the first icon 610 is chosen by a user input, the application processor 221 may reboot the electronic device 201 and update the software. During the software update, the NFC circuit 293 may operate in the uninitialized mode. When the second icon 620 is chosen by a user input, the application processor 221 may retransmit a control signal (e.g., a first control signal) for allowing the NFC circuit 293 to transition into the update mode to the NFC circuit 293. When the third icon 630 is chosen by a user input, the application processor 221 may cancel the software update and resume the normal operation of the electronic device 201.

According to an embodiment, the user interface is not limited to that described above but may rather be implemented in other various manners.

Figure 7:
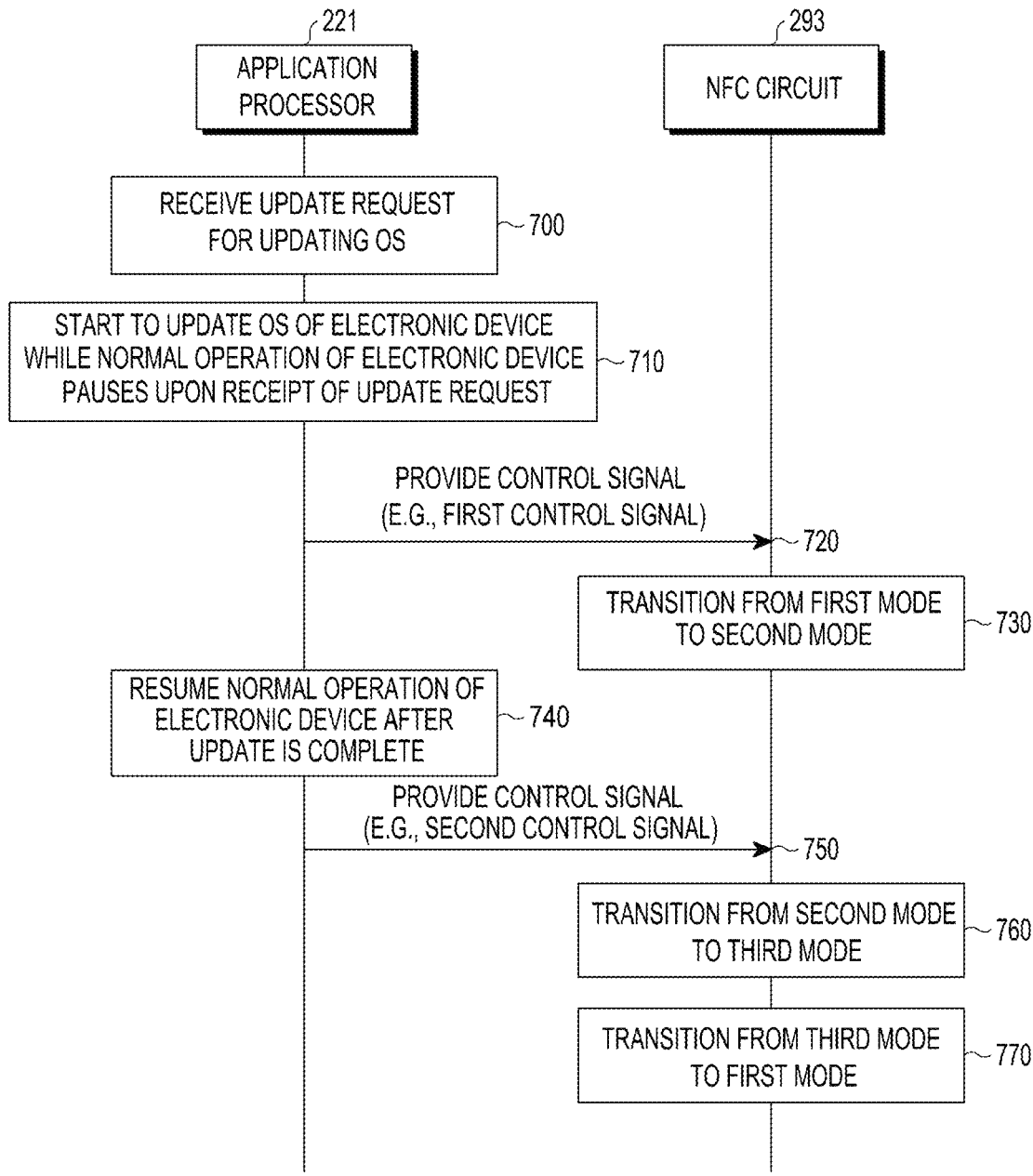
FIG. 7 is a flowchart illustrating operations between an application processor and an NFC circuit according to an embodiment.

FIG. 7 is a flowchart illustrating operations between an application processor and an NFC circuit according to an embodiment.

Referring to FIG. 7, in operation 700, the application processor 221 (e.g., the application processor of FIG. 1 or the application processor 321 of FIG. 3) may receive an update request for updating the OS of the electronic device 201.

According to an embodiment, the application processor 221 may receive a user input for updating the OS of the electronic device 201 from the user through a user interface. For example, the application processor 221 may receive the update request from the user through various types of user interfaces, such as one for executing an application related to updating the OS of the electronic device 201 or one for a voice control service for inquiring whether to proceed with the update or choosing a button or icon corresponding to the execution of the application.

According to an embodiment, the user interface may receive various types of user inputs through the input device 150 (e.g., a microphone, mouse, or keyboard), the sound output device 155 (e.g., a speaker), the display device 260 (e.g., a display or touchscreen), or at least one sensor (e.g., the sensor module 176)).

According to an embodiment, the user input may include a voice input received by the user's utterance using the input device 150 (e.g., a microphone), an input signal received by the user's physical or mechanical manipulation on the input device 150 (e.g., a mouse or keyboard), an input signal received by the user's touch, hovering, or various types of touch gestures (e.g., a doubletap, drag, drag-and-drop, swipe, or flick) on the display device 260 (e.g., a touchscreen), or an input signal received by the user's motion (or action) on at least one sensor (e.g., the sensor module 176).

According to an embodiment, the application processor 221 may receive the update request generated upon meeting a designated condition (or occurrence of an event) for updating the OS of the electronic device 201.

In operation 710, the application processor 221, upon receiving the update request for updating the OS of the electronic device 201, may start to update the OS of the electronic device 201 while the normal operation of the electronic device 201 pauses. For example, the application processor 221 may install software downloaded to update the OS from an external device.

According to an embodiment, the application processor 221, upon receiving the update request, may manually or automatically download the update software for updating the OS of the electronic device 201 from the external device.

According to an embodiment, the application processor 221 may manually download the update software based on a user input received through the user interface. For example, the application processor 221, upon receiving a request to update the OS of the electronic device 201, may provide a user interface including information containing an inquiry (e.g., a first inquiry) (e.g., "Do you want to download the update software?") as to whether to download the update software for updating the OS. The application processor 221 may receive a response to the first inquiry from the user through the user interface. For example, the information including the first inquiry provided through the user interface may include buttons or icons (e.g., "Yes" or "Download" and "No" or "Download later") to respond to the inquiry. Upon receiving a response (e.g., a first response) corresponding to "Yes" or "Download" in response to the first inquiry, the application processor 221 may download the update software for the electronic device 201. Upon receiving a response (e.g., a first response) corresponding to "No" or "Download later" in response to the first inquiry, the application processor 221 may terminate the update of the electronic device 201 without downloading the update software for the electronic device 201.

According to an embodiment, the application processor 221 may automatically download the update software. For example, upon receiving the request to update the OS of the electronic device 201, the application processor 221 may automatically download the update software for updating the OS of the electronic device 201. For example, when the designated condition is set to connection to Wi-Fi, the application processor 221 may automatically download the update software from the external device when connected to Wi-Fi.

According to an embodiment, while the update software is downloaded, the application processor 221 may maintain the normal operation of the electronic device 201.

According to an embodiment, when the update software is completely downloaded, the application processor 221 may start to update the OS.

According to an embodiment, when the update software is completely downloaded, the application processor 221 may automatically start to update the OS. For example, when the update software is completely downloaded, the application processor 221 may automatically start to update the OS so that the downloaded update software is installed.

According to an embodiment, when the update software is completely downloaded, the application processor 221 may manually start to update the OS. For example, when the update software is completely downloaded, the application processor 221 may manually start to update the OS so that the downloaded update software is installed based on a user input received through the user interface.

According to an embodiment, when the update software is completely downloaded, the application processor 221 may provide a user interface including information containing an inquiry (e.g., a second inquiry) (e.g., "Do you want to install the downloaded update software?") as to whether to install the downloaded update software. The application processor 221 may receive a response to the second inquiry from the user through the user interface. For example, the information including the second inquiry provided through the user interface may include buttons or icons (e.g., "Yes" or "Install now" and "No" or "Install later") to respond to the inquiry. Upon receiving a response (e.g., a second response) corresponding to "Yes" or "Install now") in response to the second inquiry, the application processor 221 may start to update the OS of the electronic device 201 so that the downloaded update software is installed. Upon receiving a response (e.g., a second response) corresponding to "No" or "Install later") in response to the second inquiry, the application processor 221 may terminate the OS update for the electronic device 201 to prevent the downloaded update software from being installed.

According to an embodiment, upon receiving the update request for the OS of the electronic device 201, the application processor 221 may automatically start to update the OS of the electronic device 201 so that the update software is automatically downloaded and installed.

According to an embodiment, the application processor 221, upon receiving the update request for the OS of the electronic device 201, may manually start to update the OS of the electronic device 201 so that the update software is manually downloaded by a user input (e.g., a first response) received through the user interface, and the downloaded update software is installed by a user input (e.g., a second response) received through the user interface.

According to an embodiment, upon receiving the update request for the OS of the electronic device 201, the application processor 221 may automatically start to update the OS of the electronic device 201 so that the update software is manually downloaded by the user input (e.g., the first response), and the downloaded update software is installed.

According to an embodiment, the application processor 221, upon receiving the update request for the OS of the electronic device 201, may manually start to update the OS of the electronic device 201 so that the update software is automatically downloaded, and the downloaded update software is installed by a user input (e.g., the second response) received through the user interface.

In operation 720, the application processor 221 may provide a control signal (e.g., a first control signal) to the NFC circuit 293 when the downloaded update software starts to install. For example, the control signal (e.g., the first control signal) may include a command to control the NFC circuit 293 to transition the operation mode from a first mode (e.g., the standard mode) to a second mode (e.g., the update mode).

In operation 730, the NFC circuit 293 (e.g., the NFC module of FIG. 1 or the NFC controller 393 of FIG. 3), upon receiving the control signal (e.g., the first control signal) from the application processor 221, may transition from the first mode (e.g., the standard mode) to the second mode (e.g., the update mode). For example, upon receiving the control signal (e.g., the first control signal) while operating in the first mode, the NFC circuit 293 may transition and operate in the second mode in which it may perform some of the plurality of NFC operations which may be performed in the first mode.

According to an embodiment, the plurality of NFC operations may include all operations (or functions) related to the NFC operations supported by the NFC circuit 293. For example, the plurality of NFC operations include at least one of a read data operation for reading NFC data or a write data operation for writing NFC data through the NFC circuit 293, a peer-to-peer (P2P) operation for performing inter-device communication, or a card emulation operation for emulating the NFC data.

According to an embodiment, in the first mode, the plurality of NFC operations all may be activated so that all the NFC operations may be be performed, and in the second mode, a particular operation (e.g., the card emulation operation for emulating NFC data) among the plurality of NFC operations may be activated so that only some of the plurality of NFC operations may be performed.

In operation 740, the application processor 221 may resume the normal operation of the electronic device 201 after the OS of the electronic device 201 is completely updated. For example, when rebooting the electronic device 201 is complete, the application processor 221 may start to update the software for updating the OS of the electronic device 201, and when the software update is complete, the application processor 221 may resume the normal operation of the electronic device 201.

According to an embodiment, the application processor 221 may resume at least part of the normal operation (e.g., a first normal operation) paused on the electronic device 201 or another normal operation (e.g., a second normal operation) of the electronic device 201, which differs from the paused normal operation (e.g., the first normal operation), to update the OS of the electronic device 201.

In operation 750, the application processor 221 may transmit a control signal (e.g., a second control signal) to the NFC circuit 293 for allowing the NFC circuit 293 to transition into a third mode (e.g., the uninitialized mode) while performing the resumed normal operation of the electronic device 201. For example, the control signal (e.g., the second control signal) may include a command to control the NFC circuit 293 to transition its operation mode from the second mode (e.g., the uninitialized mode) to the third mode (e.g., the uninitialized mode).

In operation 760, the NFC circuit 293, upon receiving the control signal (e.g., the second control signal) from the application processor 221, may transition from the second mode (e.g., the update mode) to the third mode (e.g., the uninitialized mode).

In operation 770, the NFC circuit 293 may proceed with firmware update and/or initialization while operating in the third mode (e.g., the uninitialized mode) and may then transition from the third mode (e.g., the uninitialized mode) to the first mode (e.g., the standard mode).

According to an embodiment, an NFC method of the electronic device 201 may include receiving, by the application processor 221, a user input for updating the OS of the electronic device 201 through a user interface, updating the OS while the normal operation of the electronic device 201 pauses in response to the reception of the user input, providing a first control signal corresponding to the update to the NFC circuit 293 operating in the first mode, and resuming the normal operation of the electronic device 201 after the OS is completely updated. The NFC method of the electronic device 201 may include receiving, by the NFC circuit 293, the first control signal while operating in the first mode, transitioning from the first mode to the second mode in response to the reception of the first control signal, and transitioning from the second mode to the first mode after resuming the normal operation of the electronic device 201 paused by the application processor 221.

Figure 8:
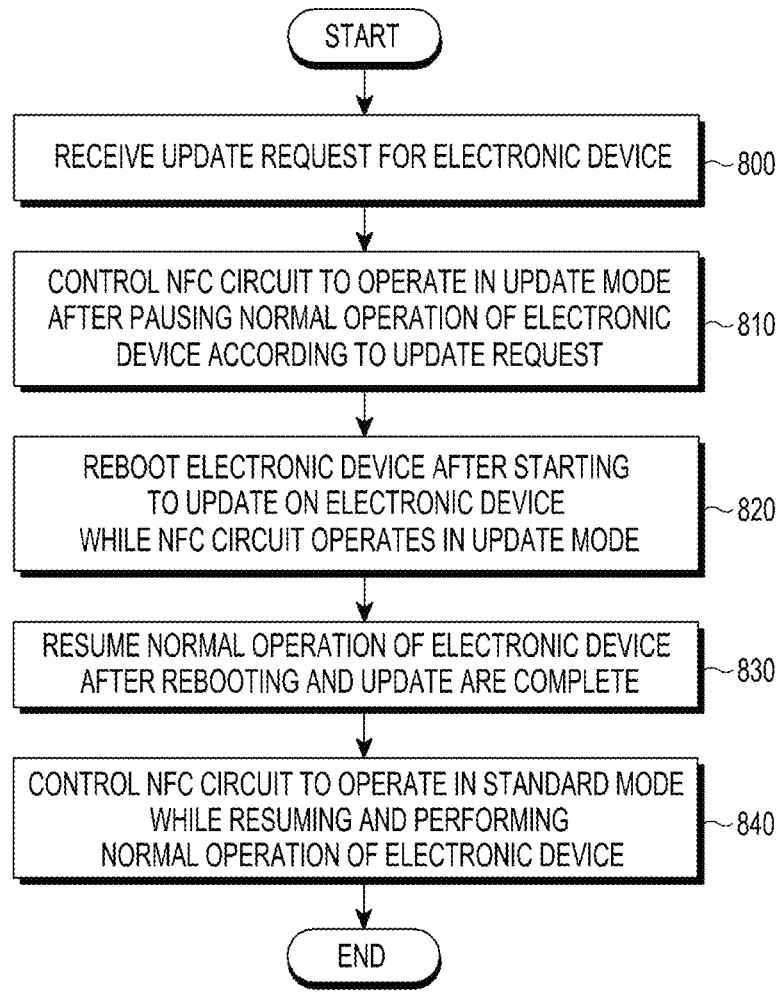
FIG. 8 is a flowchart illustrating operations of an application processor according to an embodiment.

FIG. 8 is a flowchart illustrating operations of an application processor according to an embodiment.

According to an embodiment, operations 800 to 840 may be performed by any one of an electronic device (e.g., the electronic device 101, 102, or 104 of FIG. 1, the electronic device 201 of FIG. 2, or the electronic device 301 of FIG. 3), a server 108, a processor (e.g., the processor 120 of FIG. 1, the processor 220 or the application processor 221 of FIG. 2, or the application processor 321 of FIG. 3), a communication module (e.g., the communication module 190 of FIG. 1, the communication module 290 or the NFC circuit 293 of FIG. 2, or the NFC controller 393 of FIG. 3), or a program 140.

Referring to FIG. 8, in operation 800, the application processor 221 may receive an update request for the electronic device 201.

According to an embodiment, the application processor 221 may provide various types of user interfaces, such as one for executing an application related to updating the OS of the electronic device 201 or one for a voice control service for inquiring whether to proceed with the update or choosing a button or icon corresponding to the execution of the application and may receive an input for the update request through the user interface.

According to an embodiment, the application processor 221 may determine that the update request is received when a designated condition is met (or an event occurs) for updating the OS of the electronic device 201.

In operation 810, the application processor 221 may control the NFC circuit 293 to operate in the update mode after pausing a normal operation of the electronic device 201, according to the update request. For example, the application processor 221 may transmit a control signal (e.g., the first control signal) to the NFC circuit 293 to allow the NFC circuit 293 operating in the standard mode to operate in the update mode.

In operation 820, the application processor 221 may reboot the electronic device after starting to update on the electronic device 201 while the NFC circuit 293 operates in the update mode.

In operation 830 the application processor 221 may resume the normal operation of the electronic device 201 after the rebooting and the update are complete.

In operation 840, the application processor 221 may control the NFC circuit 293 to operate in the standard mode while the normal operation of the electronic device 201 is resumed and performed. For example, the application processor 221 may allow the NFC circuit 293 to transition from the update mode to the uninitialized mode, and then transition into the standard mode after performing initialization in the uninitialized mode, by transmitting a control signal (e.g., the second control signal) for allowing the NFC circuit 293 to transition into the uninitialized mode to the NFC circuit 293.

Figure 9:
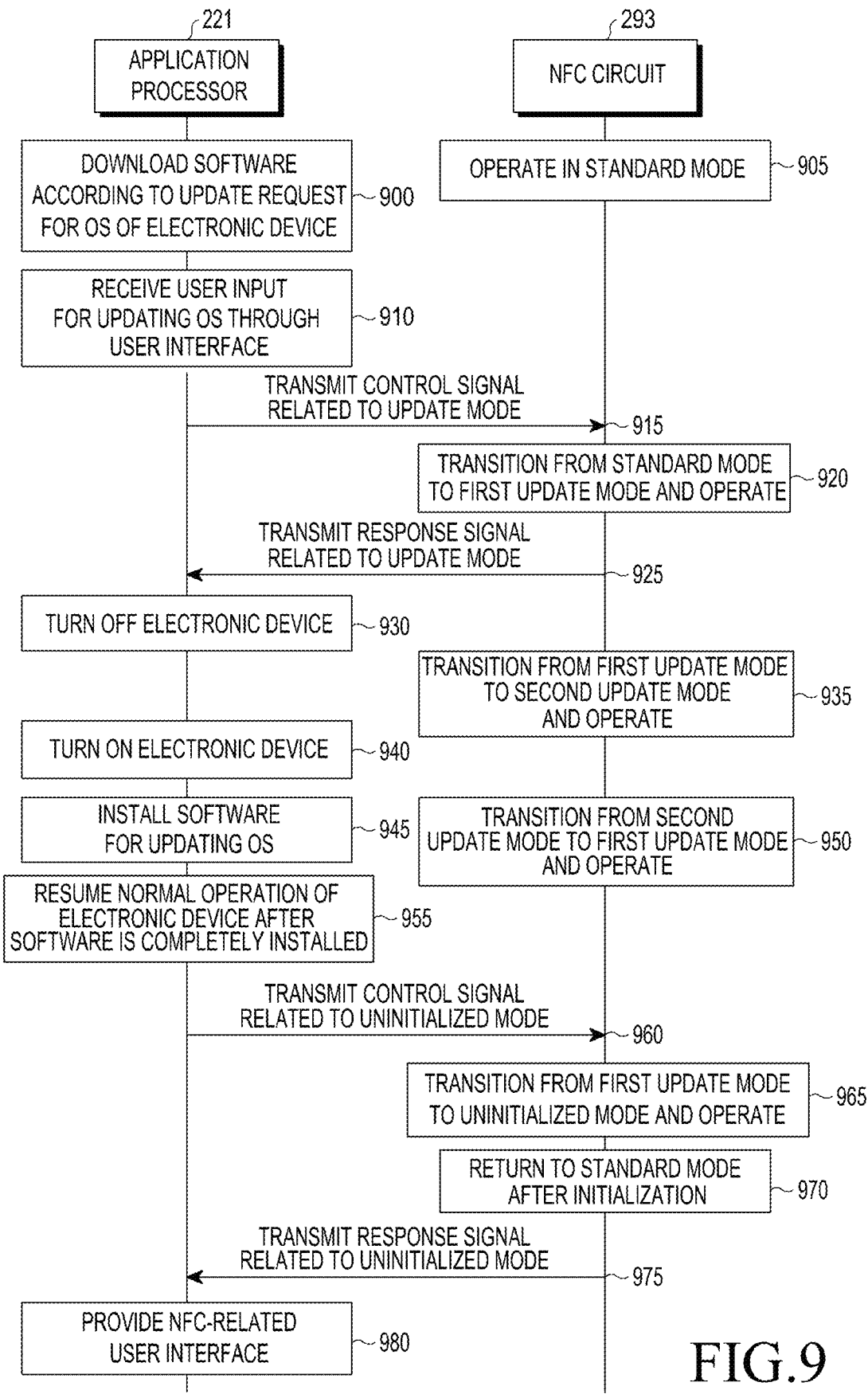
FIG. 9 is a flowchart illustrating operations between an application processor and an NFC circuit according to an embodiment.

FIG. 9 is a flowchart illustrating operations between an application processor and an NFC circuit according to an embodiment.

Referring to FIG. 9, in operation 900, the application processor 221 (e.g., the application processor of FIG. 1 or the application processor 321 of FIG. 3) may download update software for updating the OS of the electronic device 201 according to an update request for the OS of the electronic device 201.

According to an embodiment, the application processor 221, in response to receiving the update request for updating the OS of the electronic device 201, may manually or automatically download the update software for updating the OS of the electronic device 201 from the external device.

According to an embodiment, the application processor 221 may manually download the update software according to a user input received through the user interface. For example, the application processor 221, in response to receiving a request to update the OS of the electronic device 201, may provide a user interface including information containing an inquiry (e.g., a first inquiry) (e.g., "Do you want to download the update software?") as to whether to download the update software for updating the OS. The application processor 221 may receive a response to the first inquiry from the user through the user interface. For example, the information including the first inquiry provided through the user interface may include buttons or icons (e.g., "Yes" or "Download" and "No" or "Download later") to respond to the inquiry. Upon receiving a response (e.g., a first response) corresponding to "Yes" or "Download" in response to the first inquiry, the application processor 221 may download the update software for the electronic device 201. Upon receiving a response (e.g., a first response) corresponding to "No" or "Download later" in response to the first inquiry, the application processor 221 may terminate the update of the electronic device 201 without downloading the update software for the electronic device 201.

According to an embodiment, the application processor 221 may automatically download the update software. For example, in response to receiving the request to update the OS of the electronic device 201, the application processor 221 may automatically download the update software for updating the OS of the electronic device 201. For example, when the designated condition is set to connection to Wi-Fi, the application processor 221 may automatically download the update software from the external device when connected to Wi-Fi.

According to an embodiment, the application processor 221 may maintain the normal operation of the electronic device 201 while the update software is downloaded.

In operation 905, the NFC circuit 293 may operate in the standard mode. According to an embodiment, the NFC circuit 293 may perform a plurality of NFC operations while receiving full power (e.g., VDD) through the power management module (e.g., the power management module 188) from the application processor 221.

According to an embodiment, the plurality of NFC operations may include all operations (or functions) related to the NFC operations supported by the NFC circuit 293. For example, the plurality of NFC operations include at least one of a read data operation for reading NFC data or a write data operation for writing NFC data through the NFC circuit 293, a peer-to-peer (P2P) operation for performing inter-device communication, or a card emulation operation for emulating the NFC data.

According to an embodiment, in the standard mode, the plurality of NFC operations all may be activated so that all the NFC operations may be performed, and in the second mode, a particular operation (e.g., the card emulation operation for emulating NFC data) among the plurality of NFC operations may be activated so that the particular operation may be performed.

In operation 910, the application processor 221 may receive a user input for updating the OS of the electronic device 201 through a user interface.

According to an embodiment, when the update software is completely downloaded, the application processor 221 may provide a user interface including information containing an inquiry (e.g., a second inquiry) (e.g., "Do you want to install the downloaded update software?") as to whether to install the downloaded update software. The application processor 221 may receive a response to the second inquiry from the user through the user interface. For example, the information including the second inquiry provided through the user interface may include buttons or icons (e.g., "Yes" or "Install now" and "No" or "Install later") to respond to the inquiry. Upon receiving a response (e.g., a second response) corresponding to "Yes" or "Install now") in response to the second inquiry, the application processor 221 may start to update the OS of the electronic device 201 so that the downloaded update software is installed. Upon receiving a response (e.g., a second response) corresponding to "No" or "Install later") in response to the second inquiry, the application processor 221 may terminate the OS update for the electronic device 201 to prevent the downloaded update software from being installed.

According to an embodiment, the application processor 221 may immediately perform operation 915 without going through operation 910 when the update software is downloaded. For example, when the update software is downloaded, the application processor 221 may immediately perform operation 915 to install the downloaded update software so that the OS of the electronic device 201 is updated.

In operation 915, the application processor 221 may transmit a control signal (e.g., the first control signal) related to the update mode to the NFC circuit 293. For example, the control signal (e.g., the first control signal) may include a command to transition the operation mode of the NFC circuit 293 from the standard mode to the update mode.

According to an embodiment, the update mode may include a first update mode based on a first setting or a second update mode based on a second setting.

In operation 920, upon receiving the control signal (e.g., the first control signal), the NFC circuit 293 may transition from the standard mode to the update mode (e.g., a first update mode) and operate in the update mode (e.g., the first update mode).

According to an embodiment, the NFC circuit 293 may transition from the standard mode to the first update mode based on the first setting among update modes, in response to the reception of the first control signal from the application processor 221. For example, the NFC circuit 293 may operate in the first update mode, in which among the plurality of NFC operations, a particular operation (e.g., the card emulation operation for emulating NFC data) is performed, based on at least part of the first setting while the application processor 221 performs the operation to update the OS of the electronic device 201.

According to an embodiment, the first setting may include a first power setting configured to supply full power (e.g., VDD), which is delivered from the application processor 321 through the power management module 188, to the NFC controller 393.

In operation 925, the NFC circuit 293 may transmit a response signal (e.g., a first response signal) related to the update mode to the application processor 221. For example, the response signal (e.g., the first response signal) may include information indicating that the mode transition of the NFC circuit 293 from the standard mode to the update mode (e.g., the first update mode) succeeds.

In operation 930, the application processor 221 may turn off the electronic device 201 to reboot the electronic device 201, in response to the reception of the response signal from the NFC circuit 293.

According to an embodiment, when the electronic device 201 is turned off, the supply of the full power (e.g., VDD) from the application processor 221 through the power management module 188 to the NFC circuit 293 may be cut off.

In operation 935, when the electronic device 201 is turned off to cut off the supply of the full power (e.g., VDD) from the application processor 221 through the power management module 188, the NFC circuit 293 may transition from first update mode to a second update mode and operate in the second update mode.

According to an embodiment, the NFC circuit 293 may transition from the first update mode to the second update mode based on the second setting among the update modes when the supply of the full power (e.g., VDD) from the application processor 221 is cut off. For example, the NFC circuit 293 may operate in the second update mode, in which among the plurality of NFC operations, a particular operation (e.g., the card emulation operation for emulating NFC data) is performed, based on at least part of the second setting while the application processor 221 performs the operation to update the OS of the electronic device 201.

According to an embodiment, the second setting may include a second power setting configured to supply low power (e.g., VBAT), which is delivered from the battery 289, to the NFC circuit 293.

In operation 940, the application processor 221 may turn back on the electronic device 201, which has been off to reboot, in response to the reception of the response signal from the NFC circuit 293.

In operation 945, when the electronic device 201 is turned on and rebooting is complete, the application processor 221 may install software for updating the OS of the electronic device 201. For example, the application processor 221 may install the update software downloaded in operation 900 to update the OS of the electronic device 201.

In operation 950, when the electronic device 201 which used to be turned off to reboot is turned back on and then the full power (e.g., VDD) from the application processor 221 through the power management module 188 is back provided to the NFC circuit 293, the NFC circuit 293 may transition from first update mode to a second update mode and operate in the second update mode.

In operation 955, the application processor 221 may resume the normal operation of the electronic device 201 when the software is completely installed so that the OS of the electronic device 201 is completely updated.

According to an embodiment, the application processor 221 may resume at least part of the normal operation (e.g., a first normal operation) paused on the electronic device 201 or another normal operation (e.g., a second normal operation) of the electronic device 201, which differs from the paused normal operation (e.g., the first normal operation) to update the OS of the electronic device 201.

In operation 960, the application processor 221 may transmit a control signal (e.g., a second control signal) related to the uninitialized mode to the NFC circuit 293 while the normal operation of the electronic device 201 resumes. For example, the control signal (e.g., the second control signal) may include a command to transition the operation mode of the NFC circuit 293 from the update mode (e.g., the first update mode) to the uninitialized mode.

In operation 965, the NFC circuit 293 may transition from the update mode (e.g., the first update mode) to the uninitialized mode.

According to an embodiment, the NFC circuit 293 may update the firmware for the NFC circuit 293 upon requiring that the firmware of the NFC circuit 293 be updated in the uninitialized mode.

In operation 970, the NFC circuit 293 may transition into the standard mode after performing initialization in the uninitialized mode.

In operation 975, the NFC circuit 293 may transmit a response signal (e.g., a second response signal) related to the uninitialized mode to the application processor 221. For example, the response signal (e.g., the second response signal) may include information indicating that the mode transition of the NFC circuit 293 from the uninitialized mode to the standard mode succeeds.

In operation 980, the application processor 221 may provide an NFC-related user interface upon receiving the response signal (e.g., the second response signal).

Figure 10:
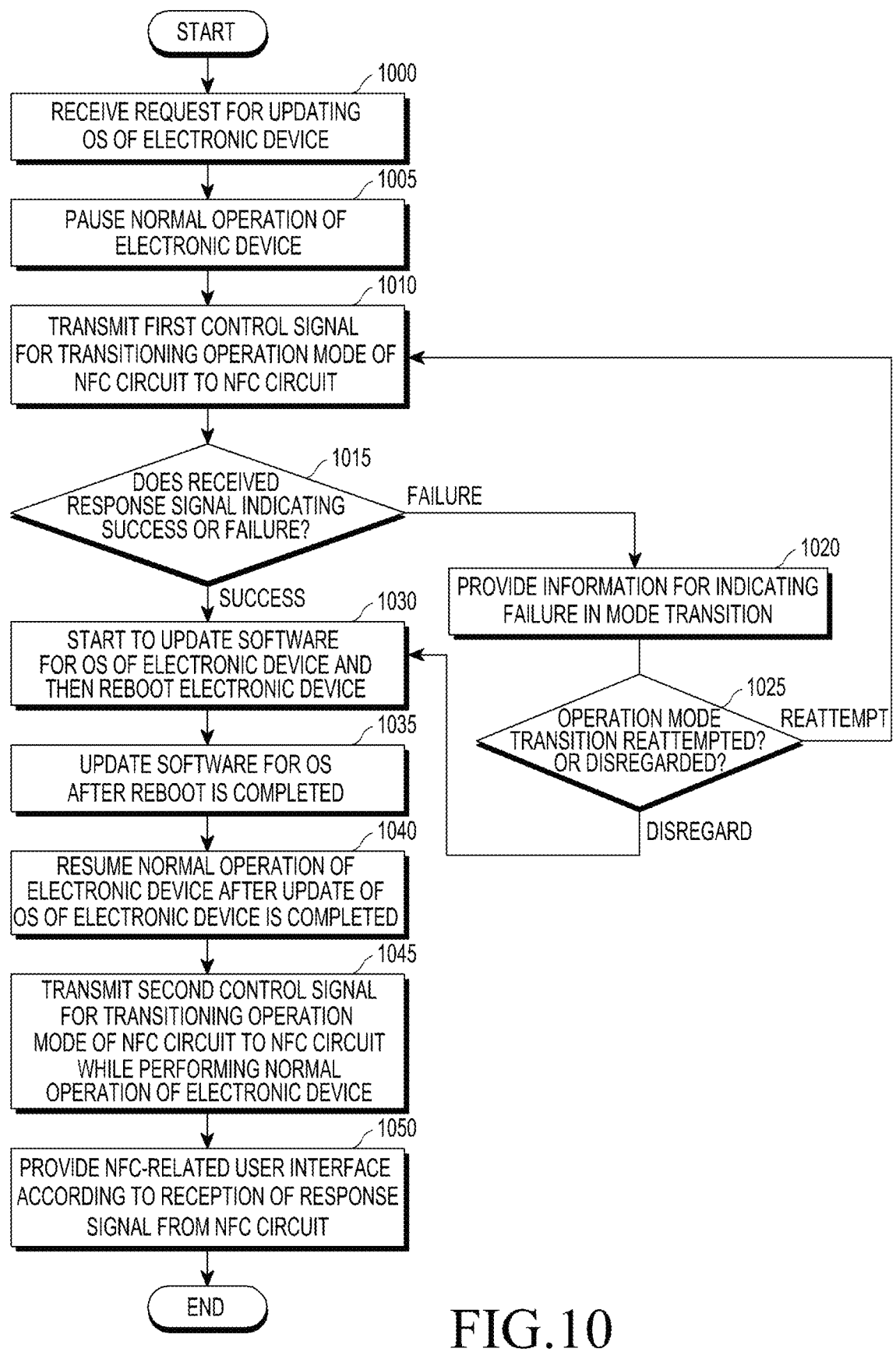
FIG. 10 is a flowchart illustrating operations of an application processor according to an embodiment.

FIG. 10 is a flowchart illustrating operations of an application processor according to an embodiment.

According to an embodiment, operations 1000 to 1050 may be performed by any one of an electronic device (e.g., the electronic device 101, 102, or 104 of FIG. 1, the electronic device 201 of FIG. 2, or the electronic device 301 of FIG. 3), a server 108, a processor (e.g., the processor 120 of FIG. 1, the processor 220 or the application processor 221 of FIG. 2, or the application processor 321 of FIG. 3), a communication module (e.g., the communication module 190 of FIG. 1, the communication module 290 or the NFC circuit 293 of FIG. 2, or the NFC controller 393 of FIG. 3), or a program 140.

Referring to FIG. 10, in operation 1000, the application processor 221 may receive an update request for the electronic device 201.

According to an embodiment, the update request regarding the electronic device 201 may be a request to update the operating system (OS) of the electronic device 201. According to an embodiment, the request may be generated upon meeting a designated condition (or occurrence of an event) or upon receiving a user input to update the OS of the electronic device 201.

In operation 1005, the application processor 221 may pause the normal operation of the electronic device 201 upon receiving the request to update the OS of the electronic device 201.

In operation 1010, the application processor 221 may transmit a first control signal for transitioning the operation mode of the NFC circuit 293 to the NFC circuit 293. For example, the first control signal may include a command for transitioning the operation mode of the NFC circuit 293 from the standard mode to the update mode.

In operation 1015, the application processor 221 may identify whether a response signal is received indicating the success or failure of the mode transition of the NFC circuit 293 from the standard mode to the update mode. Upon receiving the response signal indicating that the mode transition succeeds in operation 1015, the application processor 221 may perform operation 1030, and upon receiving the response signal indicating that the mode transition fails in operation 1015, the application processor 221 may perform operation 1020.

In operation 1020, the application processor 221 may provide information for indicating the failure of the mode transition upon receiving the response signal indicating that the mode transition of the NFC circuit 293 from the standard mode to the update mode fails. For example, the application processor 221 may provide a user interface to inquire whether to reattempt or disregard the transition into the update mode with the information.

In operation 1025, the application processor 221 may identify whether to reattempt or disregard the mode transition of the NFC circuit 293. When the application processor 221 reattempts the mode transition of the NFC circuit 293 in operation 1025, the application processor 221 may perform operation 1010, and upon disregarding the mode transition of the NFC circuit 293, the application processor 221 may perform operation 1030.

According to an embodiment, when the operation mode transition succeeds in operation 1015 so that the application processor 221 performs operation 1030, the NFC circuit 293 may operate in the update mode while the electronic device 201 is rebooted.

According to an embodiment, when the operation mode transition fails and is thus disregarded in operation 1025 so that the application processor 221 performs operation 1030, the NFC circuit 293 may operate in the low power card emulation mode while the electronic device 201 is rebooted.

In operation 1030, the application processor 221 may start to update the software for updating the OS of the electronic device 201 and then reboot the electronic device 201. For example, the application processor 221 may download the software for updating the OS of the electronic device 201 from an external device and may then reboot the electronic device 201.

In operation 1035, the application processor 221 may perform the software update after rebooting is complete. For example, the application processor 221 may install the downloaded software.

According to an embodiment, when the mode transition succeeds in operation 1015 so that the application processor 221 performs operation 1035 via operation 1030, if rebooting is complete and then the electronic device 201 is turned on, then the NFC circuit 293 may operate in the update mode. For example, the application processor 221, upon completion of the reboot, may update the software for updating the OS of the electronic device 201. The application processor 221 may resume the normal operation of the electronic device 201 when the software update is complete. According to an embodiment, when the software update is complete, the NFC circuit 293 may transition from the update mode to the uninitialized mode and may transition into the standard mode by performing initialization in the uninitialized mode. For example, the NFC circuit 293 may update firmware when there is the firmware to be updated for the NFC circuit 293. When the update of the firmware is complete, the NFC circuit 293 may transition from the uninitialized mode to the standard mode by performing initialization.

According to an embodiment, when the mode transition is disregarded in operation 1025 due to the failure of the mode transition so that the application processor 221 performs operation 1035 via operation 1030, if rebooting is complete and then the electronic device 201 is turned on, then the NFC circuit 293 may operate in the uninitialized mode. The NFC circuit 293 may transition into the standard mode by performing initialization in the uninitialized mode.

In operation 1040, the application processor 221 may resume the normal operation of the electronic device 201 after the OS of the electronic device 201 is completely updated.

According to an embodiment, the application processor 221 may resume at least part of the normal operation (e.g., a first normal operation) paused on the electronic device 201 to update the OS of the electronic device 201 or another normal operation (e.g., a second normal operation) of the electronic device 201, which differs from the paused normal operation (e.g., the first normal operation).

In operation 1045, the application processor 221 may transmit the second control signal for the mode transition of the NFC circuit 293 to the NFC circuit 293 while resuming and performing the normal operation of the electronic device 201. For example, the second control signal may include a command for transitioning the operation mode of the NFC circuit 293 from the update mode to the uninitialized mode.

According to an embodiment, when the mode transition is disregarded in operation 1025 due to the failure of the mode transition so that the application processor 221 performs operation 1035 via operation 1030, if the electronic device 201 which used to be turned off to reboot is turned back on, then operation 1045 may be skipped because the NFC circuit 293 operates in the uninitialized mode.

In operation 1050, the application processor 221 may provide an NFC-related user interface according to the reception of a response signal from the NFC circuit 293. For example, the response signal may include information indicating the success in the mode transition of the NFC circuit 293.

Figure 11:
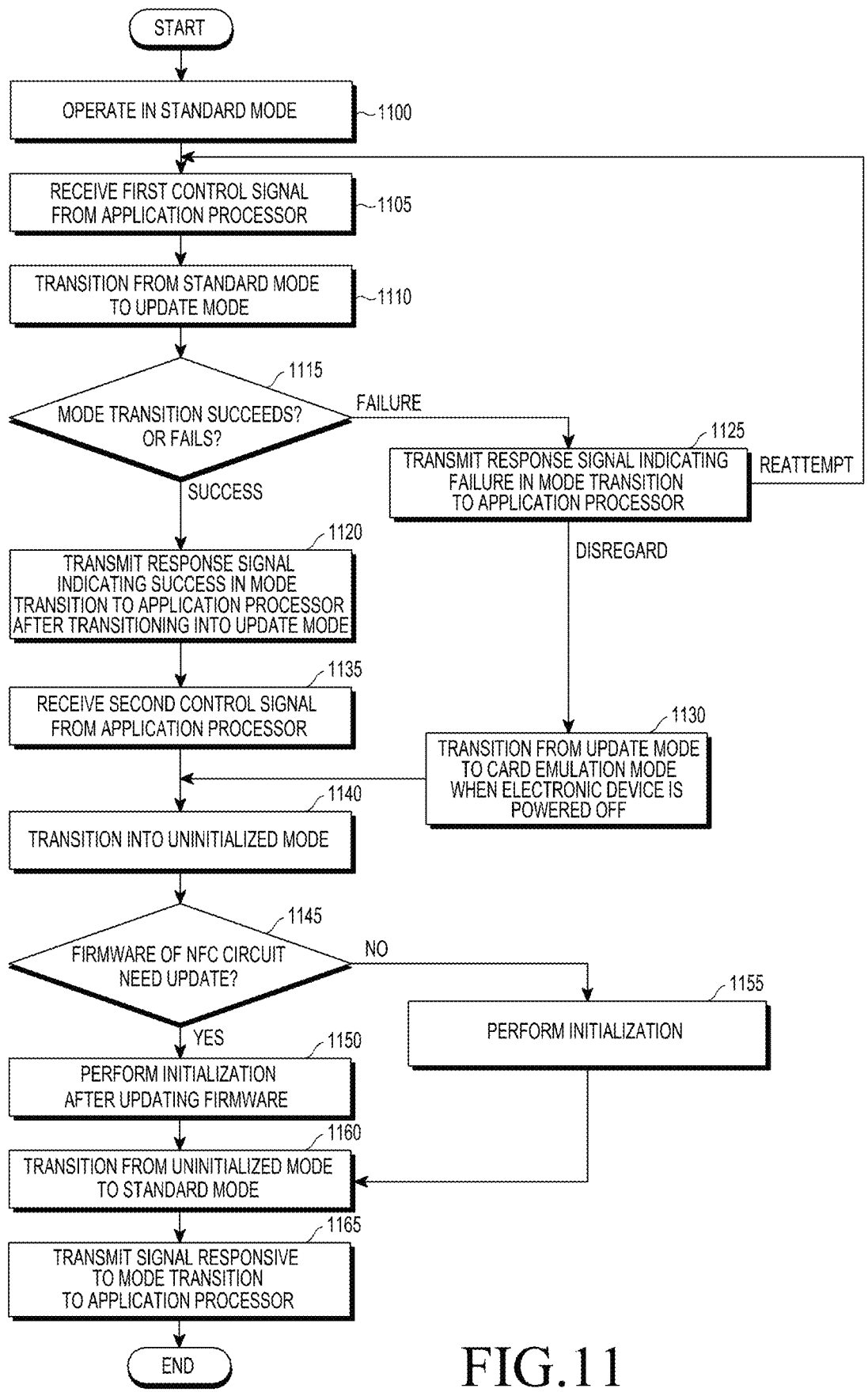
FIG. 11 is a flowchart illustrating operations of an NFC circuit according to an embodiment.

FIG. 11 is a flowchart illustrating operations of an NFC circuit according to an embodiment.

According to an embodiment, operations 1100 to 1165 may be performed by any one of an electronic device (e.g., the electronic device 101, 102, or 104 of FIG. 1, the electronic device 201 of FIG. 2, or the electronic device 301 of FIG. 3), a server 108, a processor (e.g., the processor 120 of FIG. 1, the processor 220 or the application processor 221 of FIG. 2, or the application processor 321 of FIG. 3), a communication module (e.g., the communication module 190 of FIG. 1, the communication module 290 or the NFC circuit 293 of FIG. 2, or the NFC controller 393 of FIG. 3), or a program 140.

Referring to FIG. 11, the NFC circuit 293 may operate in the standard mode in operation 1100.

According to an embodiment, the NFC circuit 293 may perform all operations (or functions) related to NFC operations supported by the NFC circuit 293 while operating in the standard mode. For example, the plurality of NFC operations include at least one of a read data operation for reading NFC data or a write data operation for writing NFC data through the NFC circuit 293, a peer-to-peer (P2P) operation for performing inter-device communication, or a card emulation operation for emulating the NFC data.

In operation 1105, the NFC circuit 293 may receive a first control signal from the application processor 221. The first control signal may include a command for transitioning the operation mode of the NFC circuit 293 from the standard mode to the update mode.

In operation 1110, the NFC circuit 293 may transition the operation mode of the NFC circuit 293 from the standard mode to the update mode, in response to the reception of the first control signal.

In operation 1115, the NFC circuit 293 may determine whether the mode transition succeeds or fails and may perform operation 1120 upon succeeding in the mode transition while performing operation 1125 upon failing in the mode transition.

In operation 1120, upon success in the mode transition, the NFC circuit 293 may transmit a response signal indicating that the mode transition succeeds to the application processor 221 after transitioning into the update mode.

In operation 1125, upon failing the mode transition, the NFC circuit 293 may transmit a response signal indicating that the mode transition fails to the application processor 221. In operation 1125, the NFC circuit 293 may perform operation 1130 or operation 1105 based on operations according to whether the application processor 221 reattempts the mode transition or performs the update while disregarding the failure of the mode transition. For example, when the application processor 221 reattempts the mode transition upon failing transitioning the operation mode of the NFC circuit 293 from the standard mode to the update mode, the NFC circuit 293 may perform operation 1105 to again receive the first control signal including the command for transitioning the operation mode of the NFC circuit 293 from the standard mode to the update mode from the application processor 221. Upon rebooting the electronic device 201 to perform the update while disregarding the failure of the mode transition, the application processor 221 may perform operation 1130.

In operation 1130, when the electronic device 201 is powered off to reboot, the NFC circuit 293 may transition the operation mode of the NFC circuit 293 from the update mode to the card emulation mode. The NFC circuit 293 may operate in the card emulation mode until the software update of the OS of the electronic device 201 is complete after the electronic device 201 is powered back on.

In operation 1135, the NFC circuit 293 may receive a second control signal from the application processor 221. The second control signal may include a command for transitioning the operation mode of the NFC circuit 293 from the update mode to the uninitialized mode.

In operation 1140, the NFC circuit 293 may transition into the uninitialized mode.

According to an embodiment, the NFC circuit 293 may transition from the update mode to the uninitialized mode upon receiving the second control signal from the application processor 221.

According to an embodiment, when operation 1140 is performed via operation 1130, the NFC circuit 293 may transition from the card emulation mode to the uninitialized mode.

In operation 1145, the NFC circuit 293 may identify whether the firmware of the NFC circuit 293 needs to be updated while operating in the uninitialized mode, and if the firmware needs to be updated, the NFC circuit 293 may perform operation 1150, and unless the firmware update is required, the NFC circuit 293 may perform operation 1155.

In operation 1150, the NFC circuit 293 may perform initialization after updating the firmware, when the firmware needs to be updated.

In operation 1155, the NFC circuit 293 may immediately perform initialization unless the firmware needs to be updated.

In operation 1160, the NFC circuit 293 may transition from the uninitialized mode to the standard mode.

In operation 1165, the NFC circuit 293 may transfer a response signal for the mode transition from the uninitialized mode to the standard mode to the application processor 221. For example, the response signal may include information indicating that the mode transition succeeds.

According to various embodiments, the NFC-related card emulation mode functions may be utilized while the electronic device 201 updates its OS.

The electronic device according to various embodiments may be one of various types of electronic devices. The electronic devices may include, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated according to the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may be configured of a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

As is apparent from the foregoing description, according to various embodiments, the electronic device may take advantage of the NFC-related functions of card emulation mode while updating its operating system.

Although the present disclosure has been described with various embodiments, various changes and modifications may be suggested to one skilled in the art. It is intended that the present disclosure encompass such changes and modifications as fall within the scope of the appended claims.

What is claimed is:

1. A computer readable recording medium storing instructions that, when executed by a processor, cause the processor to:
   receive an update request for updating an operating system (OS) of an electronic device, wherein the OS of the electronic device is different from a firmware of a NFC (near field communication) circuit,
   in response to receiving the update request, update the OS while a first operation of the electronic device is paused,
   provide a first control signal corresponding to the update to the NFC circuit performing at least some of a plurality of NFC operations in a first mode,
   resume the first operation after the update of the OS is complete, and
   enable the NFC circuit to:
     receive the first control signal while operating in the first mode,
     in response to receiving the first control signal, transit from the first mode to a second mode, and
     transit from the second mode to the first mode after the first operation is resumed by the processor.

2. The computer readable recording medium of claim 1, wherein the plurality of NFC operations include at least one of a read data operation for reading NFC data, a write data operation for writing NFC data, a peer-to-peer (P2P) operation for performing inter-device communication, or a card emulation operation for emulating the NFC data.

3. The computer readable recording medium of claim 1, wherein:
the first mode is a standard mode in which all of the plurality of NFC operations are activated to allow the NFC circuit to perform at least one of the plurality of NFC operations before the processor updates the OS,
the second mode is an update mode in which a particular operation among the plurality of NFC operations is activated to allow the NFC circuit to perform the particular operation while the processor updates the OS, and
the particular operation is a card emulation operation.

4. An electronic device, comprising:
a memory;
a first communication circuit including at least one near field communication (NFC);
a second communication circuit; and
a processor operatively connected with the memory, the first communication circuit, or the second communication circuit, wherein the processor is configured to:
identify an occurrence of a designated event for updating an operating system (OS) of the electronic device while a first operation of the electronic device is performed, wherein the OS of the electronic device is different from a firmware of the at least one NFC circuit,
in response to the occurrence of the designated event, receive update software for updating the OS from an external device through the second communication circuit, and
update the OS using the received update software,
wherein the at least one NFC circuit is configured to:
operate in a first mode before updating the OS, and
in response to performing the update of the OS, transit the first mode into a second mode.

5. The electronic device of claim 4, wherein the designated event includes a designated time, a designated cycle, a designated power status, a designated communication status, or a combination thereof.

6. The electronic device of claim 4, further comprising:
a display device;
a sensor; and
a microphone,
wherein the processor is configured to perform the update in response to receiving a user input through at least one of the display device, the sensor, or the microphone.

7. The electronic device of claim 4, wherein:
the first communication circuit includes the at least one NFC circuit configured to communicate with the external device through an NFC network, and
the second communication circuit includes at least one remote communication circuit configured to communicate with the external device through a remote communication network.

8. The electronic device of claim 4, wherein:
the first mode is a standard mode in which all of a plurality of NFC operations supported by the at least one NFC circuit are activated to allow the first communication circuit to perform at least one of the plurality of NFC operations before the processor updates the OS, and
the second mode is an update mode in which a particular operation supported by the at least one NFC circuit among the plurality of NFC operations is activated to allow the first communication circuit to perform the particular operation while the processor updates the OS.

9. The electronic device of claim 8, wherein:
the plurality of NFC operations include a read data operation for reading NFC data, a write data operation for writing NFC data, a peer-to-peer (P2P) operation for performing inter-device communication, or a card emulation operation for emulating the NFC data, and
the particular operation is the card emulation operation.

10. An electronic device, comprising:
a housing;
a user interface at least partially accommodated by the housing;
a power module positioned inside the housing;
a near field communication (NFC) circuit positioned inside the housing and connected with the power module, the NFC circuit configured to perform at least some of a plurality of NFC operations based on an operation mode;
an application processor positioned inside the housing and operatively connected with the user interface, the NFC circuit, or the power module; and
a memory operatively connected with the application processor, storing an operating system (OS) of the electronic device, and storing instructions that, when executed by the application processor, cause the application processor to:
receive an update request to update the OS, wherein the OS of the electronic device is different from a firmware of the NFC circuit,
in response to receiving the update request, update the OS while a first operation of the electronic device is paused,
provide a first control signal corresponding to the update to the NFC circuit operating in a first mode,
resume the first operation after the update of the OS is complete, and
enable the NFC circuit to:
receive the first control signal while operating in the first mode,
in response to receiving the first control signal, transit from the first mode to a second mode, and
transit from the second mode to the first mode after the first operation is resumed by the application processor.

11. The electronic device of claim 10, wherein the plurality of NFC operations include at least one of a read data operation for reading NFC data, a write data operation for writing NFC data, a peer-to-peer (P2P) operation for performing inter-device communication, or a card emulation operation for emulating the NFC data.

12. The electronic device of claim 11, wherein:
the first mode is a standard mode in which all of the plurality of NFC operations are activated to allow the NFC circuit to perform at least one of the plurality of NFC operations while the application processor updates the OS,
the second mode is an update mode in which a particular operation among the plurality of NFC operations is activated to allow the NFC circuit to perform the particular operation while the application processor updates the OS, and
the particular operation is the card emulation operation.

13. The electronic device of claim 11, wherein the memory stores instructions that, when executed by the application processor, cause the application processor to enable the NFC circuit to:
  in response to receiving the first control signal, transit from the first mode to the second mode or from the second mode to a third mode based on at least part of a first setting, and
  in response to turning off the electronic device or cutting off supply of full power to the NFC circuit, transit from the first mode to the second mode or from the first mode to a fourth mode based on at least part of a second setting.

14. The electronic device of claim 13, wherein:
  the first setting includes a first power setting configured to supply the full power, which is transferred from the application processor through a power management integrated circuit (PMIC) of the power module, to the NFC circuit, and
  the second setting includes a second power setting configured to supply low power, which is transferred from a battery of the power module, to the NFC circuit.

15. The electronic device of claim 13, wherein:
  the third mode is an uninitialized mode that deactivates the NFC circuit, and
  the fourth mode is a card emulation mode that activates the NFC circuit to perform the card emulation operation among the plurality of NFC operations with low power transferred from a battery of the power module.

16. The electronic device of claim 10, further comprising a second communication circuit, wherein the memory stores instructions that, when executed by the application processor, cause the application processor to:
  download update software for updating the OS from an external device through the second communication circuit, and
  update the OS using the downloaded update software.

17. The electronic device of claim 10, wherein the memory stores instructions that, when executed by the application processor, cause the application processor to resume at least part of the paused first operation or another first operation of the electronic device different from the paused first operation.

18. The electronic device of claim 10, wherein the memory stores instructions that, when executed by the application processor, cause the application processor to:
  provide a second control signal to the NFC circuit after the paused first operation is resumed, and
  enable the NFC circuit to, in response to receiving the second control signal, transition into a third mode in which the NFC circuit is deactivated.

19. The electronic device of claim 18, wherein the memory stores instructions that, when executed by the application processor, cause the application processor to enable the NFC circuit to:
  update the firmware corresponding to the NFC circuit while operating in the third mode, and
  transit into the first mode when the firmware update is complete.

20. The electronic device of claim 10, wherein the memory stores instructions that, when executed by the application processor, cause the application processor to:
  receive a signal, responsive to the first control signal, from the NFC circuit, and
  in response to receiving the response signal, restart the electronic device.

* * * * *